(12) United States Patent
Julian et al.

(10) Patent No.: US 7,518,722 B2
(45) Date of Patent: Apr. 14, 2009

(54) MULTI-CHANNEL, MULTI-SPECTRUM IMAGING SPECTROMETER

(75) Inventors: Jason P. Julian, Rutland, MA (US); Kevin M. Didona, Chelmsford, MA (US); Darrin P. Milner, Litttleton, MA (US); Thomas L. Mikes, Palm City, FL (US); Scott D. Milligan, Hubbardston, MA (US); David P. Bannon, Hopkinton, MA (US)

(73) Assignee: Headwall Photonics, Inc., Fitchburg, MA (US)

( * ) Notice: Subject to any disclaimer, the term of this patent is extended or adjusted under 35 U.S.C. 154(b) by 235 days.

(21) Appl. No.: 11/208,443

(22) Filed: Aug. 19, 2005

(65) Prior Publication Data

US 2006/0038997 A1 Feb. 23, 2006

Related U.S. Application Data

(60) Provisional application No. 60/602,747, filed on Aug. 19, 2004.

(51) Int. Cl.
*G01J 3/36* (2006.01)
*G02B 5/18* (2006.01)

(52) U.S. Cl. .................. 356/328; 359/570; 359/572

(58) Field of Classification Search ................ 356/328, 356/326; 359/566, 569–575
See application file for complete search history.

(56) References Cited

U.S. PATENT DOCUMENTS

| | | | | |
|---|---|---|---|---|
| 4,259,014 A | * | 3/1981 | Talmi | 356/328 |
| 4,375,919 A | * | 3/1983 | Busch | 356/326 |
| 4,494,872 A | * | 1/1985 | Busch | 356/328 |
| 4,566,792 A | * | 1/1986 | Suzuki | 356/319 |
| 4,983,039 A | * | 1/1991 | Harada et al. | 356/328 |
| 5,880,834 A | * | 3/1999 | Chrisp | 356/328 |
| 5,995,221 A | * | 11/1999 | Slutter et al. | 356/326 |
| 6,081,331 A | * | 6/2000 | Teichmann | 356/328 |
| 6,100,974 A | * | 8/2000 | Reininger | 356/300 |
| 6,181,418 B1 | * | 1/2001 | Palumbo et al. | 356/328 |
| 6,204,919 B1 | * | 3/2001 | Barshad et al. | 356/326 |
| 6,266,140 B1 | | 7/2001 | Xiang et al. | |
| 6,288,781 B1 | * | 9/2001 | Lobb | 356/326 |

(Continued)

*Primary Examiner*—Gregory J. Toatley, Jr.
*Assistant Examiner*—Bryan Giglio
(74) *Attorney, Agent, or Firm*—Weingarten, Schurgin, Gagnebin & Lebovici LLP

(57) ABSTRACT

A multi-spectrum, multi-channel imaging spectrometer includes two or more input slits or other light input devices, one for each of two or more input channels. The input slits are vertically and horizontally displaced, with respect to each other. The vertical displacements cause spectra from the two channels to be vertically displaced, with respect to each other, on a single image sensor on a stationary image plane. The horizontal displacements cause incident light beams from the respective input channels to strike a convex grating at different respective incidence angles and produce separate spectra having different respective spectral ranges. A retroflective spectrometer includes a convex grating that, by diffraction, disperses wavelengths of light at different angles and orders approximately back along an incident light beam. A single concave mirror reflects both the input channel and the dispersed spectrum. A prism, set of mirrors, beam splitters or other optical element(s) folds the input channel(s) of a spectrometer to enable the input(s) to be moved away from the plane of the image sensor, thereby enabling a large camera or other device to be attached to the spectrometer without blocking the input(s). A mounting mechanism enables a curved optical element to be adjusted through lateral and transverse translations, without requiring a gimbal mount.

34 Claims, 20 Drawing Sheets

U.S. PATENT DOCUMENTS

| | | |
|---|---|---|
| 6,522,404 B2 | 2/2003 | Mikes et al. |
| 6,538,736 B1 * | 3/2003 | Palumbo .................... 356/326 |
| 6,636,305 B2 * | 10/2003 | Zhao et al. ................. 356/300 |
| 6,870,619 B1 * | 3/2005 | Tenhunen et al. ........... 356/330 |
| 7,019,833 B2 * | 3/2006 | Harnisch .................... 356/328 |
| 2006/0017924 A1 * | 1/2006 | Kowarz et al. .............. 356/330 |

* cited by examiner (As viewed from Concave Mirror 410)

MULTI-CHANNEL, MULTI-SPECTRUM IMAGING SPECTROMETER

CROSS REFERENCE TO RELATED APPLICATIONS

This application claims the benefit of U.S. Provisional Patent Application No. 60/602,747, filed Aug. 19, 2004, titled "Multi-Channel, Multi-Spectrum Imaging Spectrometer."

STATEMENT REGARDING FEDERALLY SPONSORED RESEARCH OR DEVELOPMENT

Not Applicable

BACKGROUND OF THE INVENTION

The present invention relates to imaging spectrometers and, more particularly, to compact, multi-channel and/or multi-spectrum imaging concentric spectrometers.

A spectrometer is an instrument that separates radiation, such as light, into a spectrum of energy bands (wavelengths) and indicates the relative intensity of each band. In the case of visible light, a spectrometer typically separates the light into a spectrum that ranges from violet (short wavelength) light to red (long wavelength) light.

Analyzing a spectrum of electromagnetic energy that is reflected from, or emitted by, an object can assist in identifying the chemical composition or physical properties of the object. For example, spectrometers are used in astronomy to analyze the chemical composition of stars. In another example ("Raman laser spectroscopy"), an object is illuminated by a laser. The laser light excites atoms of the object, and these atoms emit light of a wavelength, or several wavelengths, different than the laser light. Comparing the wavelength of the laser light with the wavelength(s) of the emitted light can assist in identifying the chemical composition of the object. Raman and other laser spectroscopy techniques are used to analyze minerals and geological samples, semiconductor wafers, process manufacturing samples and chemicals, such as suspected biological or chemical warfare agents. In another example of spectral analysis, scanning a scene, such as a scene viewed from a reconnaissance aircraft or a satellite, with a spectrometer can be used to detect features of interest, such as freshly disturbed soil. Such an analysis can be useful in detecting freshly planted crops or recently laid landmines, for example. Products based on optical wavelength separation capabilities (such as multiplexers and de-multiplexers) can also be used in fiber optic telecommunication systems for optical wavelength switching to separate wavelength-division multiplexed (WDM) channels carried over a single optical fiber.

Conventional spectrometers used for Raman analysis are relatively large and heavy laboratory-based instruments, primarily due to the large optical focal lengths inherent in the designs of high resolution instruments. In addition, conventional spectrometers can produce spectra of fairly limited ranges of wavelengths at higher reciprocal dispersions.

BRIEF SUMMARY OF THE INVENTION

Spectrometers having a variety of features are disclosed. A multi-spectrum spectrometer can produce spectra over a wider total range of wavelengths than conventional spectrometers with high reciprocal dispersions. A high-dispersion, retroflective spectrometer is smaller and lighter than conventional spectrometers of this type. A spectrometer with folded input channel light path(s) permits attaching a large camera, detector or other device to the spectrometer without interfering with the input channel(s). In addition, a mechanism is disclosed for adjusting a convex mirror or other curved optical element, such as in a spectrometer or imaging system, without requiring a gimbal mount. Spectrometers can include one or more of the features disclosed herein. For example, a multi-channel, multi-spectrum, high-dispersion retroflective spectrometer having folded input channels and the mirror adjustment mechanism includes several of these features.

The multi-spectrum spectrometer includes two or more input slits or other light input devices, one for each input channel. The input slits are vertically displaced, with respect to each other. The vertical displacement causes the spectra from the two or more channels to be vertically displaced, with respect to each other, on an image sensor. Thus, the spectra can be separately imaged on a single image plane. The input slits are also horizontally displaced, with respect to each other. The horizontal displacement causes incident light beams from the respective input channels to strike a convex grating at different respective incidence angles. These different incidence angles at the convex grating result in two or more spectra having different respective spectral ranges, despite all the spectra being diffracted at the same range of angles. Collectively, the spectra cover a larger range of wavelengths, i.e. a larger bandwidth, than a single spectrum could cover, in a single grating device.

The retroflective spectrometer includes a convex grating that produces a first order dispersion approximately back along the incident light beam. Thus, a single concave mirror reflects both the input channel and the dispersed spectrum, providing a smaller, lighter spectrometer.

A prism, a set of mirrors or another optical element(s) folds the input channel(s) of a spectrometer to enable the inputs to be moved away from the plane of the image sensor, thereby enabling a large camera or other device to be attached to the spectrometer, without blocking the input(s) in a retroflective configuration.

A mounting mechanism enables a curved optical element to be adjusted within a spectrometer or other instrument, without requiring a gimbal mount. The mounting mechanism enables the optical element to be moved laterally and transversely. For small excursions about a central location, such linear movements closely approximate the two angular degrees of freedom provided by a pair of gimbals for an incident beam.

These and other features, advantages, aspects and embodiments of the present invention will become more apparent to those skilled in the art from the Detailed Description of the Invention that follows.

BRIEF DESCRIPTION OF THE SEVERAL VIEWS OF THE DRAWINGS

The invention will be more fully understood by referring to the Detailed Description of the Invention in conjunction with the Drawings, of which.

DETAILED DESCRIPTION OF THE INVENTION

The contents of U.S. Provisional Patent Application No. 60/602,747, filed Aug. 19, 2004, titled "Multi-Channel, Multi-Spectrum Imaging Spectrometer," is hereby incorporated by reference.

For simplicity, visible light will be used to describe the operation of the prior art and the present invention. However, the present invention can be used with visible light and invisible light, such as near-infrared (NIR), short wave infrared (SWIR) and ultraviolet (UV) light, as well as other wavelengths of electromagnetic energy and combinations of visible and invisible energy, all of which are herein collectively referred to as "light" for simplicity.

Conventional Spectrometers

A typical spectrometer includes a slit or other light entry device, a light dispersing element for dispersing the incoming light into a spectrum, and an image plane, such as a screen or image sensor, on which the spectrum is projected. Most spectrometers use a diffraction grating as the light dispersing element, although other elements, such as prisms, can be used.

A diffraction grating disperses an incident light beam into its constituent wavelengths, thereby creating a spectrum. Dispersion means distributing light across a physical dimension according to wavelength. A diffraction grating includes a plurality of closely spaced grooves that have been etched or milled into the surface of the grating.

Figure 1:
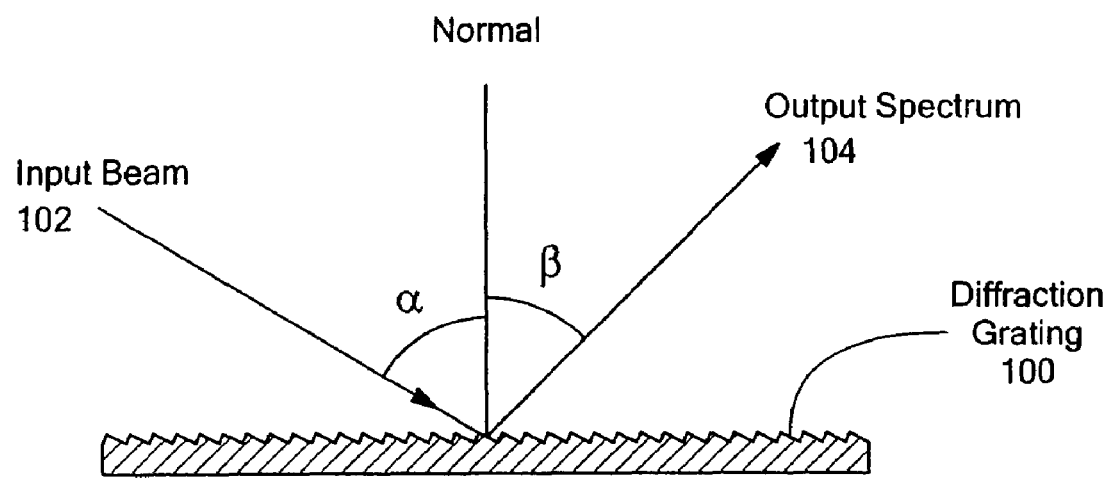
FIG. 1 is a cross-sectional view of a diffraction grating, according to the prior art.
Figure 2:
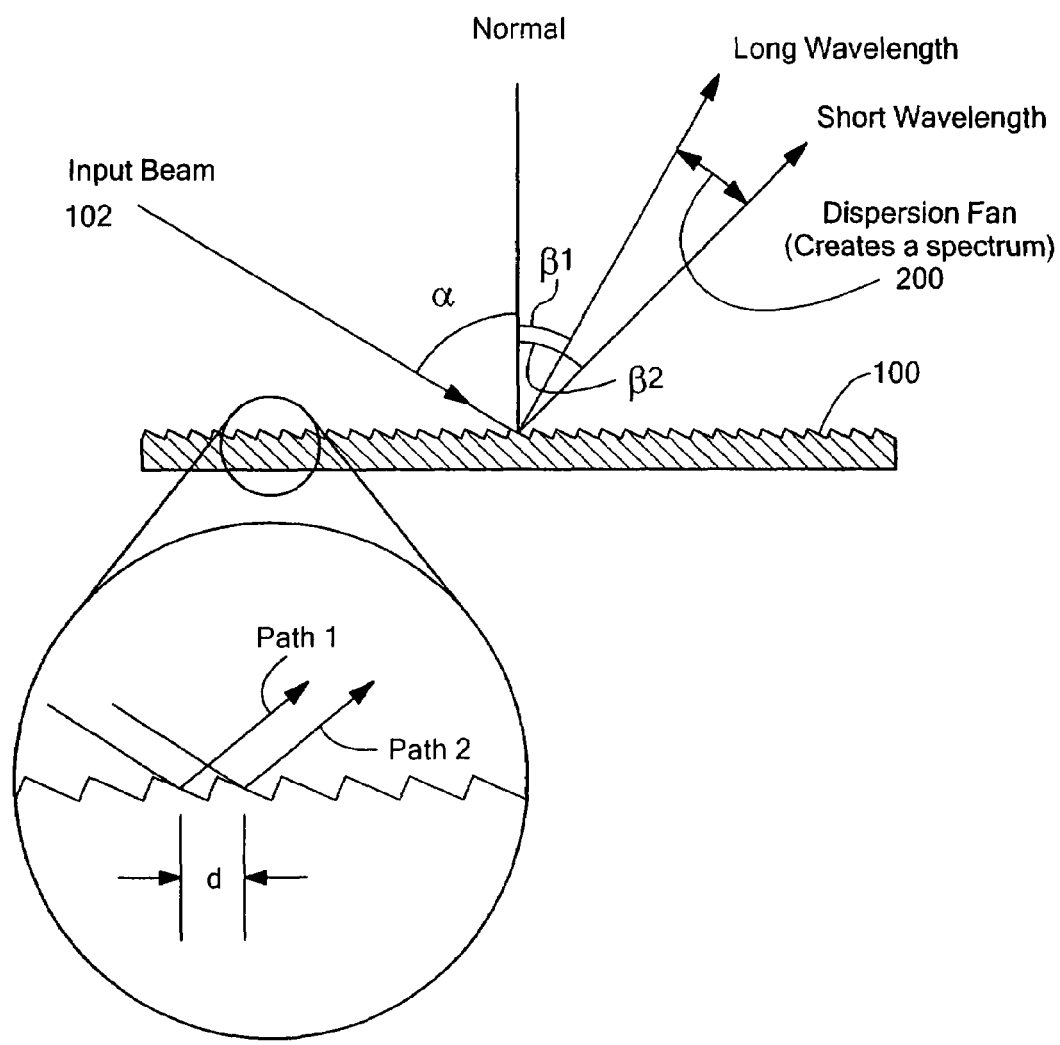
FIG. 2 is another cross-sectional view of the diffraction grating of FIG. 1.

A diffraction grating surface can be flat or curved. The grooves of a diffraction grating can be straight or curved, parallel with constant spacing, non-parallel or variably spaced. FIG. 1 is a cross-sectional view of a typical diffraction grating 100. The grooves in the diffraction grating 100 shown in FIG. 1 are saw-tooth shaped, although other shapes, such as sinusoids, can be used. FIG. 1 shows an input light beam (incident beam) 102 and a diffracted beam 104. The angle of the incident beam is $\alpha$, and the angle of the diffracted beam is $\beta$. For a given incidence angle $\alpha$, the angle $\beta$ of the diffracted beam depends on the spacing between adjacent grooves and the wavelength of the diffracted light. Thus, each wavelength is diffracted at a different angle $\beta$, thereby dispersing the various wavelengths of the incident beam 102 across a dispersion fan 200, as shown in FIG. 2. The dispersion fan 200 contains a continuum of wavelengths of light constituting a spectrum. The incidence and diffraction angles are related by the well-known diffraction grating formula (1).

$$\sin \alpha + \sin \beta = nm\lambda \quad (1)$$

In the diffraction grating formula (1), n is an integer, m is the grating frequency or pitch (i.e., m=1/d, where d equals the spacing between adjacent grooves) and $\lambda$ is the wavelength of the diffracted beam. Thus, long wavelengths are diffracted at relatively small angles, such as $\beta 1$, and short wavelengths are diffracted at relatively large angles, such as $\beta 2$.

As shown in the insert in FIG. 2, light is reflected from each groove. Each such reflection creates a separate light path. If two parallel paths (such as Path 1 and Path 2) differ in length by a whole multiple of a wavelength (i$\lambda$, where i is an integer), constructive interference reinforces the light of that wavelength, and destructive interference tends to cancel light of other wavelengths. Thus, paths parallel to Path 1 and Path 2 contain light primarily of a single wavelength. Paths reflected at other angles contain light primarily of other respective wavelengths.

Figure 3:
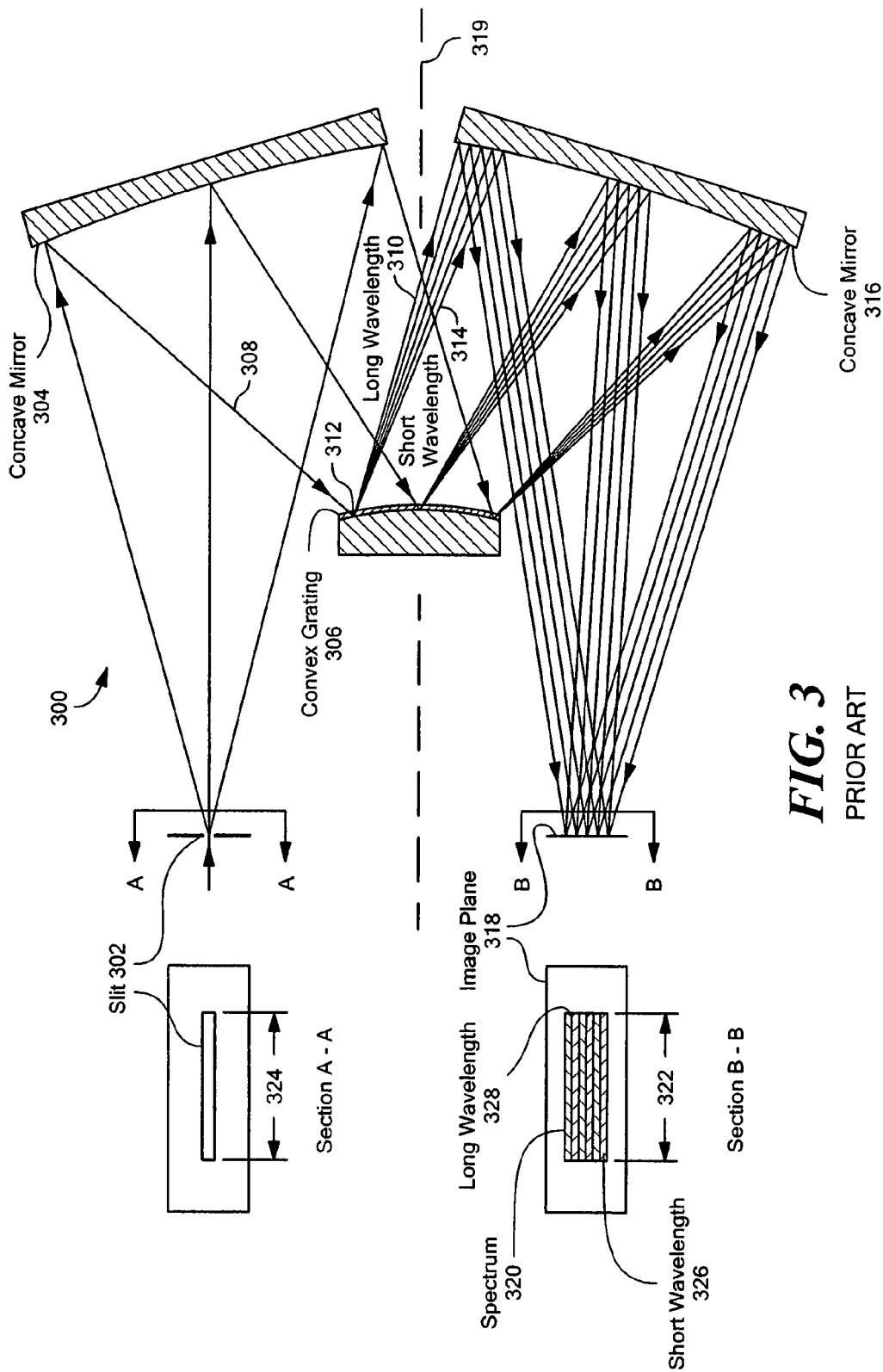
FIG. 3 is a cross-sectional view of an imaging spectrometer, according to the prior art.

FIG. 3 is a cutaway view of a prior art Offner-design spectrometer 300. Light enters a slit 302 and is reflected by a first concave mirror 304 onto a convex grating 306. (For simplicity, in FIG. 1 and other drawings, only single rays are traced. In operation, additional light is admitted, according to the height(s) of the slit(s).) The convex grating 306 spatially disperses the light by wavelength. That is, a beam of light incident on the grating is separated into its component wavelengths (colors). Each wavelength is diffracted along a different angle away from the point at which the incident light strikes the convex grating 306. For example, for incident light beam 308, long wavelength light 310 is diffracted from the point of incidence 312 at a different angle than short wavelength light 314 is diffracted from the point of incidence. A second concave mirror 316 focuses the dispersed light onto an image plane 318. (In some cases, a single large concave mirror surface (not shown) is used in place of the two separate concave mirrors 304 and 316.) Thus, in an Offner-design spectrometer, light follows an M-shaped path from the input slit 302, to the first concave mirror 304, to the convex grating 306, to the second concave mirror 316 and to the image plane 318. The M can, but need not be, symmetric about a dashed line 319 that bisects the convex grating 306.

Section B-B shows a spectrum 320 produced on the image plane 318. The height 322 of the spectrum 320 corresponds to the height 324 (shown in section A-A) of the slit 302. The shortest wavelength light 326 dispersed by the convex grating 312 appears at one end of the spectrum 320, and the longest wavelength light 328 dispersed by the convex grating appears at the other end of spectrum. Intermediate wavelengths of light appear between the two ends of the continuous spectrum. The range of wavelengths of light dispersed by the convex grating 312, i.e., the difference between the longest wavelength 328 and the shortest wavelength 326, is referred to as the "bandwidth" of the spectrometer. A given convex gratings design yields a particular spectral bandwidth. Thus, conventional spectrometers have bandwidths that are limited by their respective convex gratings.

Multi-Spectrum Spectrometer

Figure 4:
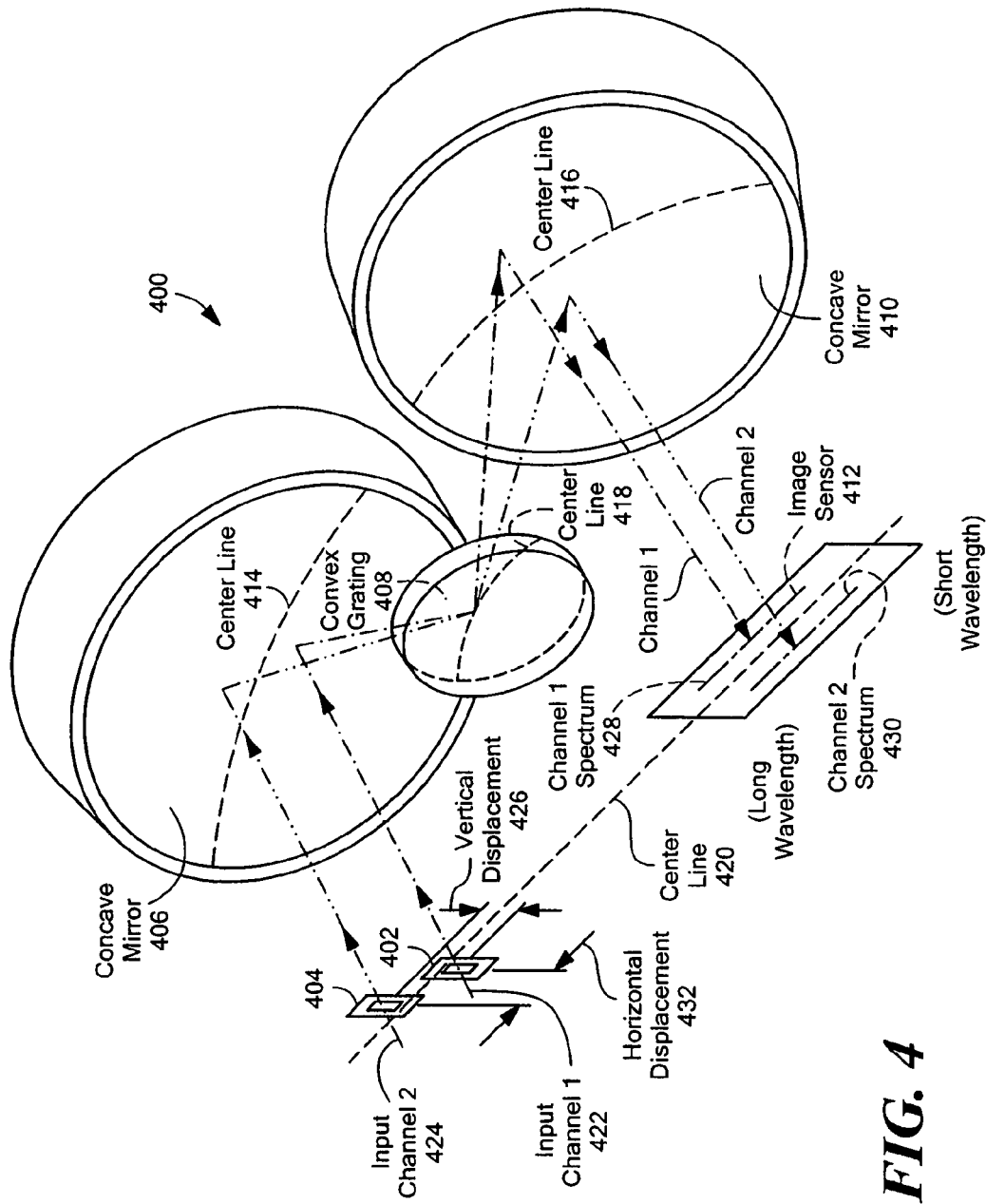
FIG. 4 is a perspective view of a multi-spectrum spectrometer, according to one embodiment of the present invention.

Multi-spectrum spectrometers according to the present disclosure provide larger bandwidths than conventional spectrometers with high reciprocal dispersions. FIG. 4 is a perspective view of an exemplary multi-spectrum (high-bandwidth) spectrometer 400. The spectrometer 400 includes two input slits 402 and 404, a first concave mirror 406, a convex grating 408, a second concave mirror 410 and an image sensor 412, such as a pixilated charge-coupled device (CCD) image sensor array. The concave mirrors 406 and 410 and the convex grating 408 are spherical, parabolic, aspherical, toroidal segment, or other curved elements. The output of the image sensor 412 is typically provided to a computer or other circuit (not shown) for analysis or processing.

The convex grating 408 is preferably an aberration-corrected grating having curved, non-parallel grooves. Such a convex grating can be formed as a holographic (or interference) grating by coating a convex blank with a light-sensitive compound (commonly referred to as a "photoresist") and exposing the photoresist to two spaced-apart light sources, such as lasers. An interference pattern is recorded in the photoresist. As the photoresist is chemically developed and etched, the interference pattern results in a surface relief comprising a set of straight or curved spaced lines in the surface of the blank. The resulting grating has a sinusoidal cross-sectional shape, as described in U.S. Pat. No. 6,266, 140, the contents of which are hereby incorporated by reference herein. Alternatively, diffraction gratings with straight and/or parallel grooves and/or unequally spaced grooves can be used. Appropriate diffraction gratings are available from Headwall Photonics, Fitchburg, Mass. 01420.

A first dashed line 414 indicates the centerline of the first concave mirror 408, and a second dashed line 416 indicates the centerline of the second concave mirror 410. A third dashed line 418 indicates the centerline of the convex grating 408. The three centerlines 414, 416 and 418 are approximately coplanar. The three centers of spherical radii of the optics (the concave mirrors 408 and 410 and the convex grating 408) are approximately "concentric" around this plane. A fourth centerline 420 is also coplanar with the other three centerlines 414, 416 and 418. Preferably, the image sensor 412 is disposed, such that the centerline 420 bisects the image sensor, and the input slits 402 and 404 are preferably disposed symmetrically on opposite sides of the centerline 420, although other arrangements are acceptable. In particular, both slits 402 and 404 can be disposed on the same side of the centerline 420. In this case, the image sensor 412 is disposed on the opposite side of the centerline 420 from the slits 402 and 404.

The two input slits 402 and 404 admit light of two input channels 422 and 424, respectively, into the spectrometer 400. The light of the two channels 422 and 424 is reflected by the first concave mirror 406 onto the convex grating 408, which disperses the light into two respective spectra. The spectra are reflected by the second concave mirror 410 onto the image sensor 412.

The two input slits 402 and 404 are vertically displaced, as shown at 426, with respect to each other. As a result of this vertical displacement 426, the spectra 428 and 430 produced from the light of the two input channels 402 and 404 are vertically displaced, with respect to each other, on the image sensor 412, so at least respective portions of the two spectra do not overlap on the image sensor, and at least these portions of the two spectra can be separately imaged by the image sensor 412.

Figure 5:
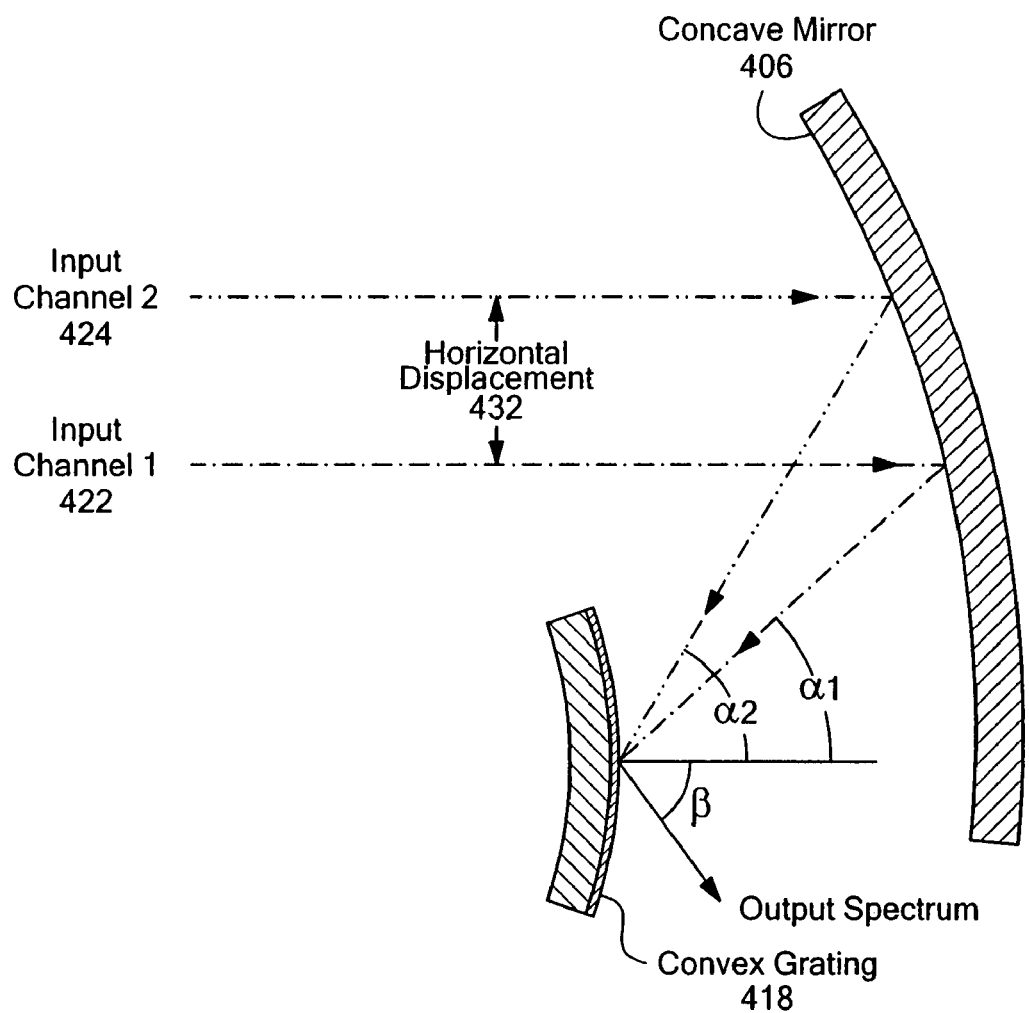
FIG. 5 is a cross-sectional view of a portion of the multi-spectrum spectrometer of FIG. 4.

The two input slits 402 and 404 are also horizontally displaced, as shown at 432, with respect to each other. As shown in FIG. 5 (which shows a cross-sectional view of a portion of the spectrometer 400), this horizontal displacement 432 causes the light from the two input channels 422 and 424 to strike the convex grating 408 at different respective angles of incidence $\alpha 1$ and $\alpha 2$. These different incidence angles $\alpha 1$ and $\alpha 2$ cause two different wavelengths of light to be diffracted at each diffraction angle $\beta$ from the diffraction grating 418, according to the diffraction grating formula (1). Light of the first input channel 422 that is diffracted at each angle $\beta$ has a longer wavelength than light of the second input channel 424 that is diffracted at the same angle $\beta$.

Figure 6:
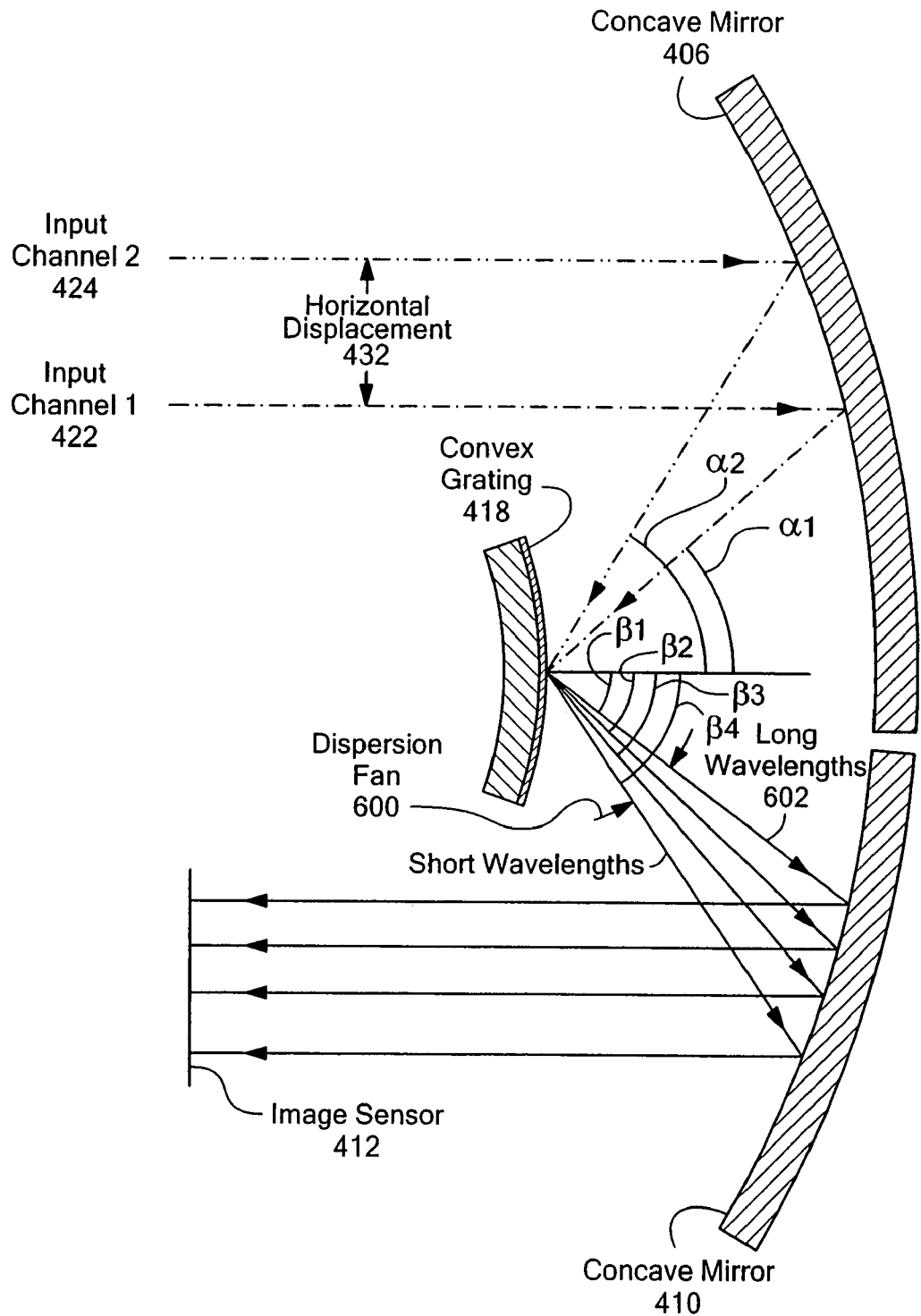
FIG. 6 is a cross-sectional view of another portion of the multi-spectrum spectrometer of FIG. 4.

Thus, as shown in FIG. 6, over a single dispersion fan 600, at each of an infinite number of diffraction angles (exemplified by $\beta 1$, $\beta 2$, $\beta 3$ and $\beta 4$), two different wavelengths of light diffract. The diffractions from the light of the first input channel 422 produce the first spectrum 428, and the diffractions from the light of the second input channel 424 produce the second spectrum 430. The paths of the long wavelength extremes of the two spectra 428 and 430 can coincide, as shown at 602. However, the wavelength of the light in the long wavelength extreme of the first spectrum 428 is longer than the wavelength of the light in the long wavelength extreme of the second spectrum 430, due to the different incidence angles $\alpha 1$ and $\alpha 2$. Thus, two different spectra, each having two different sets of wavelengths, are projected onto the second concave mirror 410 and, thereby, reflected onto the image sensor 412.

Figure 7:
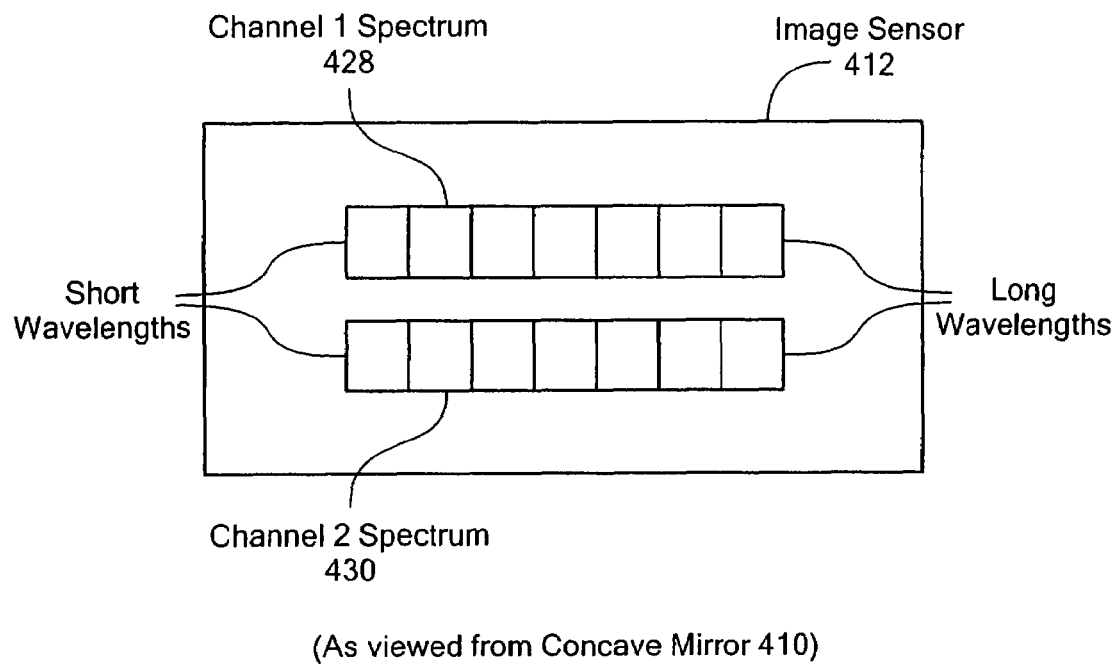
FIG. 7 is a schematic diagram of an image sensor of the multi-spectrum spectrometer of FIG. 4, as viewed from a concave mirror of the spectrometer.

Thus, as shown in FIG. 7, the spectrum 428 produced from the light of one input channel 422 contains light of a first wavelength at the long wavelength end of the spectrum 428, and light of a second wavelength at the short wavelength end of the spectrum 428. In addition, the spectrum 430 produced from the light of the other input channel 424 contains light of a third wavelength (greater than the first wavelength) at the long wavelength end of the spectrum 430, and light of a fourth wavelength (greater than the second wavelength) at the short wavelength end of the spectrum 430.

In one embodiment, the groove pitch of the convex grating 418 is about 146 grooves per millimeter (mm) and the input channels 422 and 424 are horizontally displaced by about 4.6 mm. In this embodiment, the first channel's spectrum 428 extends from about 400 nanometers (nm) to about 1000 nm, and the second channel's spectrum 430 extends from about 900 nm to about 1700 nm.

Thus, the two spectra 428 and 430 produced from the two input channels 422 and 424, respectively, have different, and possibly overlapping, ranges of wavelengths, even though both spectra are diffracted at the same angles from the diffraction grating 418. This configuration is referred to as a "multi-spectrum" spectrometer.

The total range of wavelengths for the spectra of the two channels 422 and 424 is larger than the range of wavelengths in the spectrum of either channel alone. If a single light source is fed into both input channels 422 and 424, the light can be analyzed over a wider range of wavelengths than by a conventional, i.e. single-spectrum, spectrometer. For example, the output from the image sensor 412 can be provided to a computer or other circuit (not shown), which can "stitch together" the two spectra into a single, high-bandwidth spectrum.

The image sensor 412 can comprise a combination two or more sections, where sensors of each section are fabricated according to a different technology, so each section is sensitive to a different (possibly overlapping) range of wavelengths. For example, one portion of a sensor can utilize silicon CCD elements, and another portion of the sensor can utilize InGaAs elements. Similarly, a combination of sensors, each utilizing a different technology, can be used. In either case, the sensors or sensor sections are collectively referred to herein as a single sensor array.

Alternatively, instead of, or in addition to, relying on the horizontal displacement 432 to cause the light from the two input channels 422 and 424 to strike the convex grating 418 at different angles, the light beams of the two input channels 422 and 424 can be made non-parallel. For example, slits 402 and 402 can be made not co-planar, or optical elements, such as one or more mirrors, can be used to direct the light beams projecting through the slits 402 and 404 so they are not parallel.

Alternatively, the light beams of the two input channels 422 and 424 can strike the convex grating 418 at the same angle. In this case, the wavelength ranges of the two input channels 422 and 424 can be different, thus producing spectra having different wavelength ranges.

Figure 8:
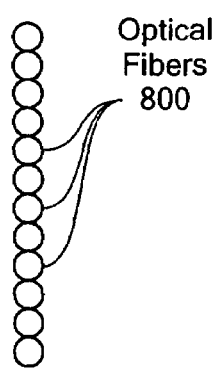
FIG. 8 is a schematic diagram of a column of optical fibers used as an alternative light entry device for the multi-spectrum spectrometer of FIG. 4.

Although FIG. 4 shows slits 402 and 404 being used to admit light of the two respective input channels 422 and 424, other input configurations of light entry devices are possible. For example, as shown in FIG. 8, a plurality of optical fibers 800 can be vertically stacked, one above the other in a column, to admit the light of one of the input channels. A spectrum produced from each of the optical fibers 800 can be imaged by a separate set of pixels in the image sensor 412. Thus, light carried by each of the optical fibers 800 can be analyzed separately. As discussed in more detail below, all the optical fibers 800 need not carry light from a single light source. For example, one or more of the optical fibers can carry light from a first light source, such as a Raman laser, and one or more other of the optical fibers can carry light from another light source, such as an object illuminated by the Raman laser. In another example, the optical fibers are connected to multiple light collection devices at multiple test locations.

Figure 9:
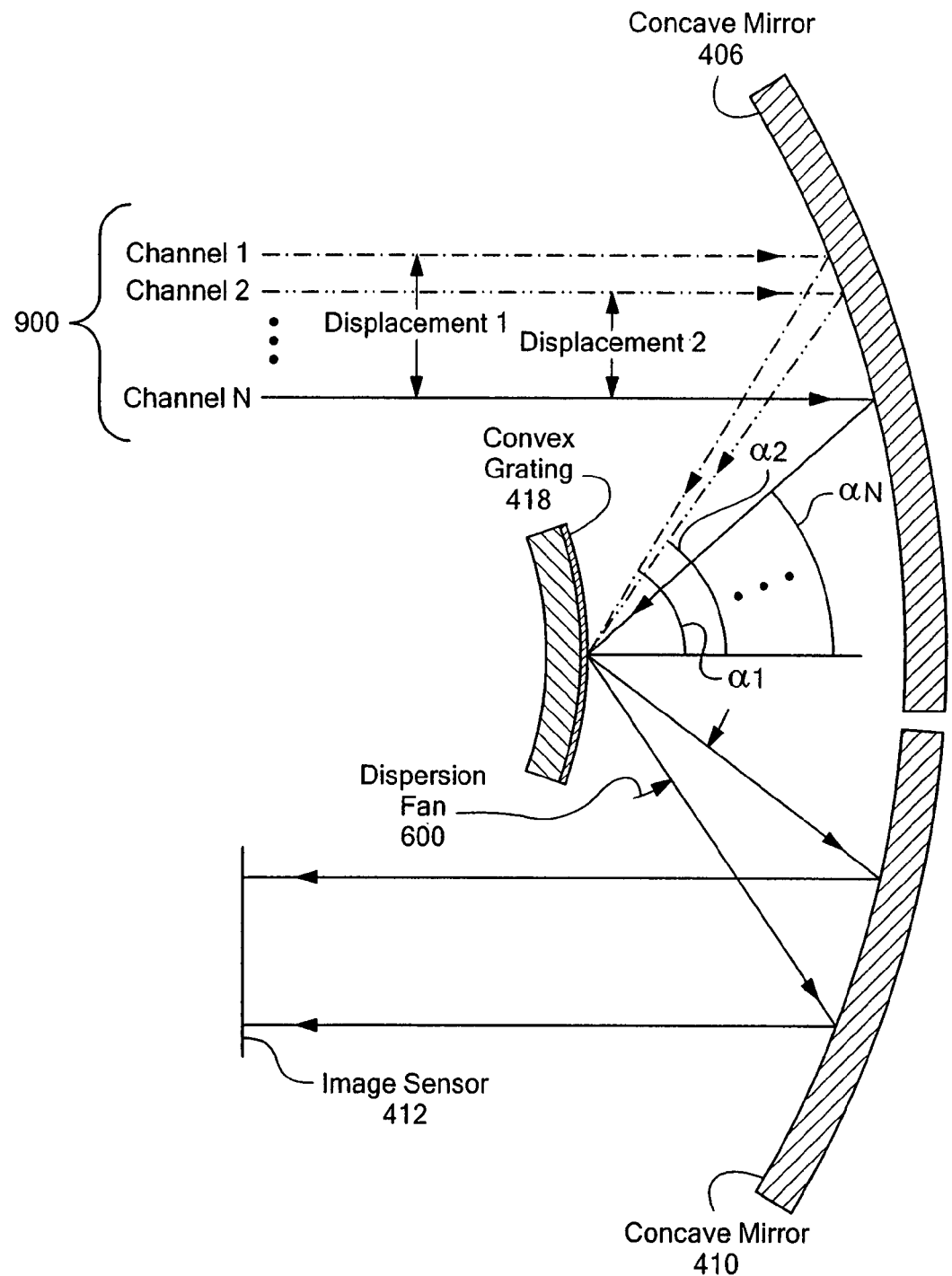
FIG. 9 is a cross-sectional view of another embodiment of the multi-spectrum spectrometer of FIG. 4.

Furthermore, multi-spectrum spectrometers are not limited to two input channels. As shown in FIG. 9, more than two input channels 900 can be provided. The entrance slit, column of optical fibers, or other light entry device of each input channel 900 is horizontally displaced by a different amount (Displacement 1, Displacement 2, etc.), thereby causing light from each input channel to strike the convex grating 418 at a different respective incidence angle $\alpha 1$, $\alpha 2$, ... $\alpha N$. As discussed above, the entrance slit, column of optical fibers, etc. of each input channel 900 is typically vertically displaced by a different amount to enable the spectra from the respective input channels 900 to be spaced apart at the focal plane. For example, these spectra can be separately image by the image sensor 412.

Because each channel's slit or other light entry device is horizontally and vertically displaced, with respect to each other, the rays from each channel's light entry device follow a slightly different (and, in some cases, spectral-range specific) path through the spectrometer. However, all the spectra are preferably simultaneously imaged onto a single focal plane detector or set of focal plane detectors.

Retroflective Spectrometer

As noted above with respect to FIG. 3, conventional Offner spectrometers include two concave mirrors 304 and 316 or a single large concave mirror surface that plays the role of the two mirrors. In either case, the size and weight of the concave mirror(s), as well as the M-shaped light path, make conventional spectrometers large and heavy. Retroflective spectrometer embodiments according to the present disclosure are lighter and smaller than conventional spectrometers and enable higher reciprocal dispersion and facilitating very fine resolution measurements.

Figure 10:
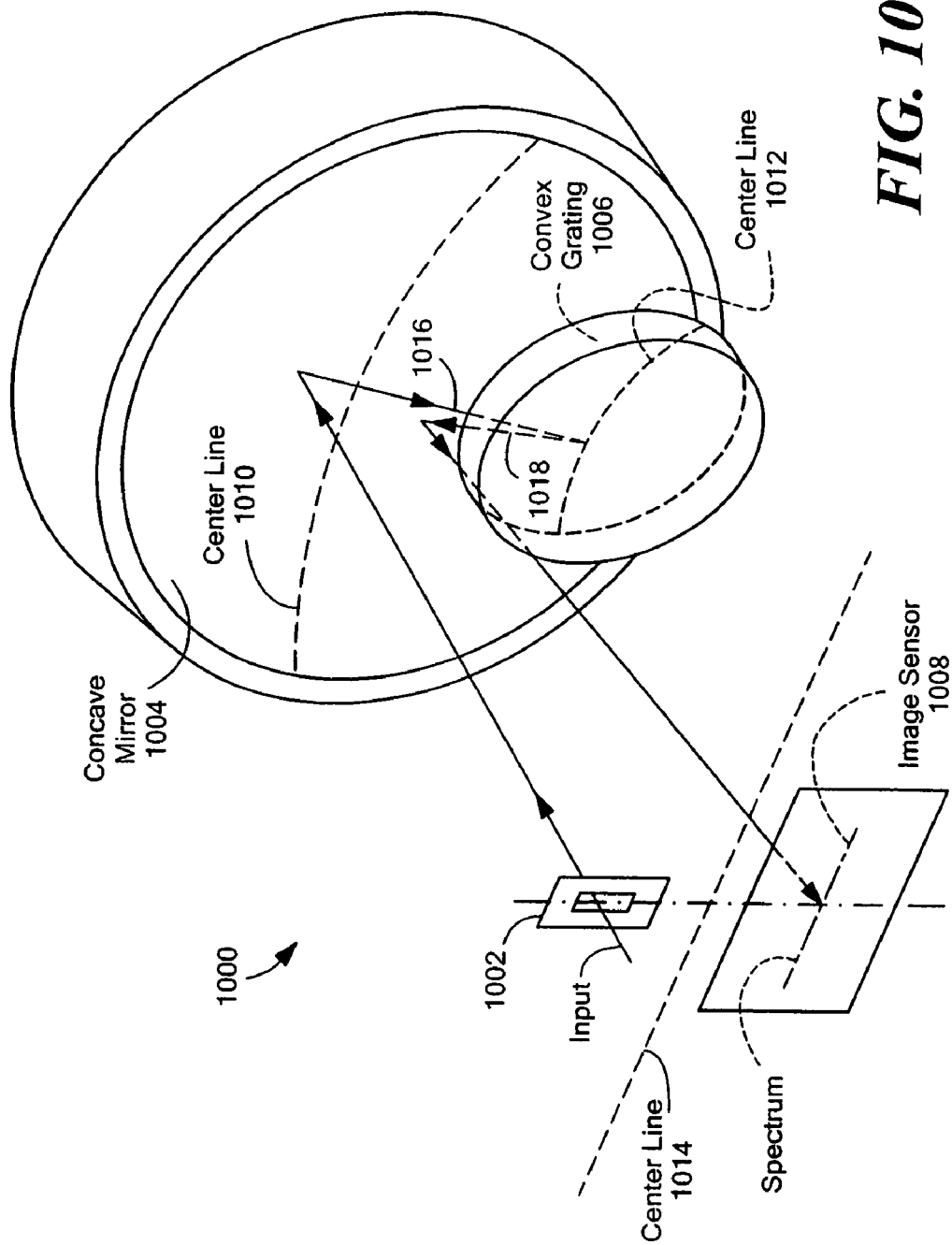
FIG. 10 is a perspective view of a retroflective spectrometer, according to another embodiment of the present invention.

FIG. 10 is a perspective view of an exemplary retroflective spectrometer 1000. The spectrometer 1000 includes an input slit or other light entry device 1002, a single concave mirror 1004, a high reciprocal dispersion convex grating 1006 and an image sensor 1008. Dashed line 1010 indicates the centerline of the concave mirror 1004, and dashed line 1012 indicates the centerline of the convex grading 1006. The two centerlines 1010 and 1012 are coplanar and the spherical centers of the components are approximately concentric. A third dashed line 1014 is also coplanar with the other two centerlines 1010 and 1012.

The input slit 1002 admits light into the spectrometer 1000. The concave mirror 1004 reflects an incident beam of light 1016 onto the convex grating 1006. The convex grating 1006 is designed such that, for input light having wavelengths of interest, the dispersion fan produced by the convex grating follows a path 1018 that is directed back along an angle approximately the same as the angle of the incident beam 1016. Such a configuration is referred to as "retroflective" or being in a Littrow condition, meaning the output chief rays propagate along a path close to, or coincident with, the input rays, such that the separation distance between the input and output focii are less than about 30% of the focal distance of the system. The dispersion fan is reflected by the single concave mirror 1004 onto the image sensor 1008.

As noted with respect to FIG. 2, an incident beam 102 produces a dispersion fan 200. The angles $\beta 1$ and $\beta 2$ at which the long and short wavelengths, respectively, are dispersed depend on the angle of incidence $\alpha$ of the input beam 102 and the respective wavelengths, according to the diffraction grating formula (1).

$$\sin \alpha + \sin \beta = nm\lambda \quad (1)$$

Figure 11:
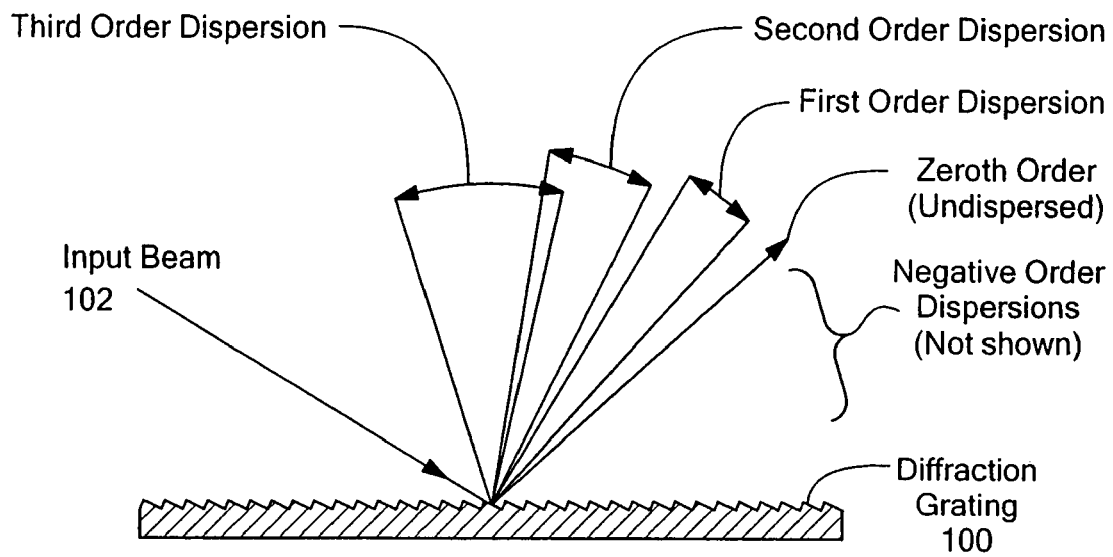
FIG. 11 is another cross-sectional view of the diffraction grating of FIG. 1.

Various (integer) values of n in the diffraction grating formula (1) produce respective dispersion fans (commonly called "orders of dispersion"), as shown in FIG. 11. The 0th (zeroth) order contains undispersed light, i.e. the 0th order is reflected light containing all the wavelengths of the input beam 102. As is well known in the art, higher order dispersions are broader, i.e. they encompass wider dispersion fan angles, than lower order dispersions, and some high order dispersions overlap some of the lower order dispersions, as shown in FIG. 11.

Figure 12A:
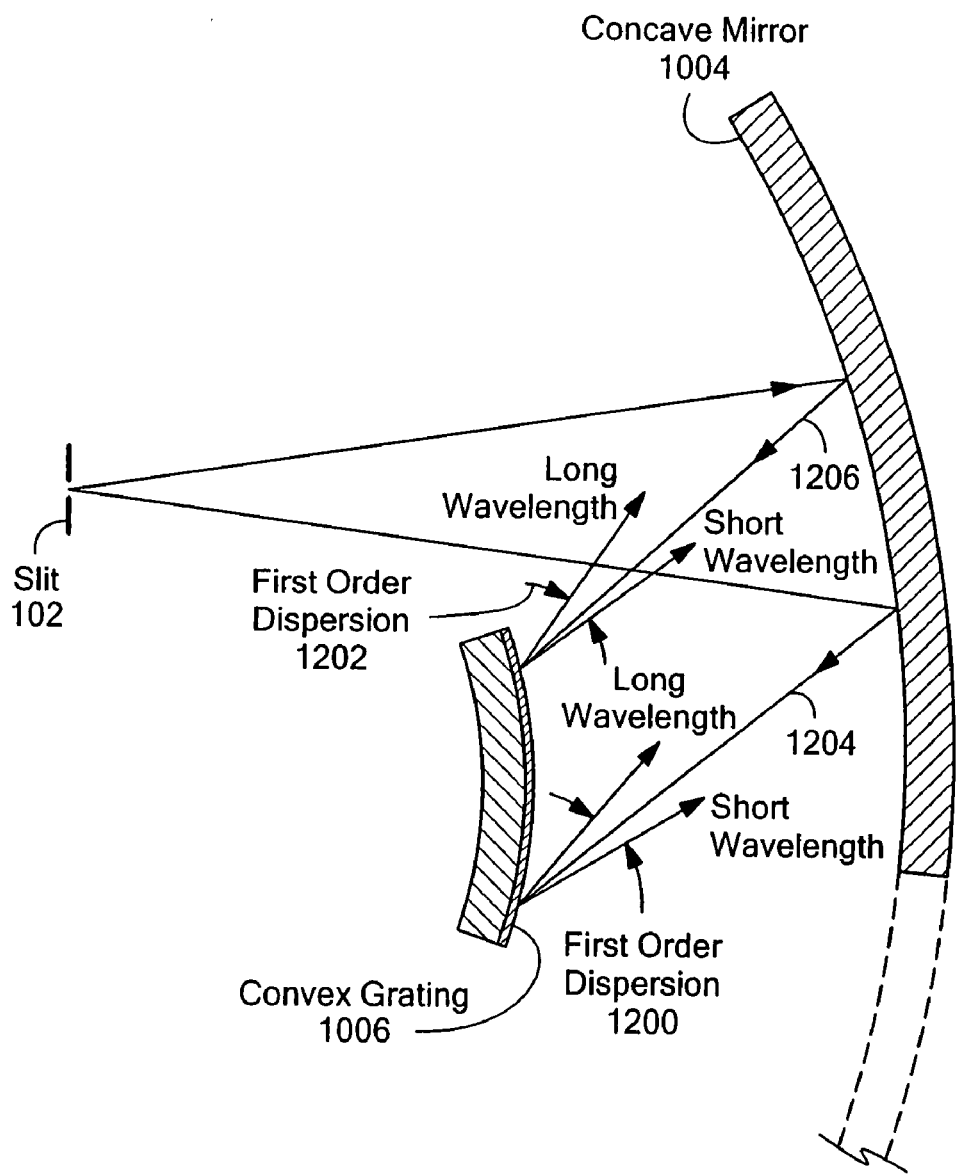
FIG. 12A is a cross-sectional view of the retroflective spectrometer of FIG. 10.

As shown in FIG. 12A (which shows a cross-sectional view of the retroflective spectrometer of FIG. 10), a groove pitch is selected for the convex grating 1006, such that for a given range of input beam wavelengths, the 1st (first) order dispersions (such as dispersions 1200 and 1202) occur approximately back along the respective incident beams (such as incident beams 1204 and 1206). For example, for a spectral range of about 760 to about 900 nm, a groove pitch of about 1000 grooves per mm can be used.

Known techniques can be used to optimize propagation of the 1st order dispersion, i.e. to maximize the amount of energy in the 1st order dispersion. In general, this is accomplished by utilizing a near-Littrow light path, in which the wavelength λ of the light and the spacing d between adjacent grooves are related according to formula (2).

$$2/3 < \lambda d < 2 \quad (2)$$

In general, diffraction gratings that maximize the energy of the 1st order dispersions are preferred. However, depending on the range of input wavelengths of interest and the desired angles of diffraction, it may be preferable to use other order dispersions, including negative order dispersions. For example, it may be preferable to use 2nd (second) order dispersions or −1st (negative first) or −2nd (negative second) order dispersions. In such cases, diffraction gratings can be designed to maximize the energy in the selected order dispersion.

Figure 13:
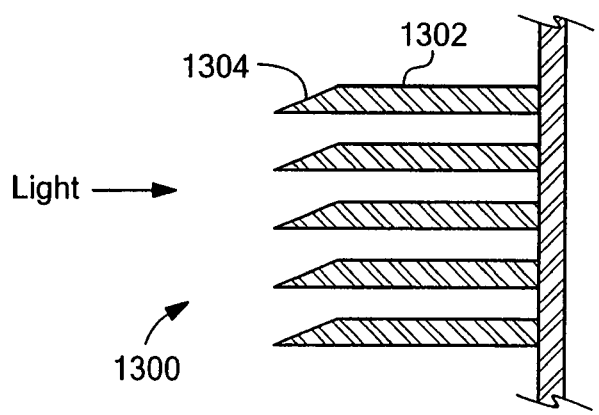
FIG. 13 is a cross-sectional view of a portion of a light trap, according to one embodiment of the present invention.

One or more light traps are preferably disposed within the spectrometer 1000 to trap dispersions, particularly the 0th order dispersion, other than the selected order dispersion. FIG. 13 is a cross-sectional view of a portion of an appropriate light trap 1300. The light trap 1300 includes a plurality of vanes, such as vane 1302. The ends of the vanes are shaped like knife-edges, as shown at 1304. The surfaces of light trap 1300 are coated with a light-absorbing material, such as flat black paint.

Figure 12B:
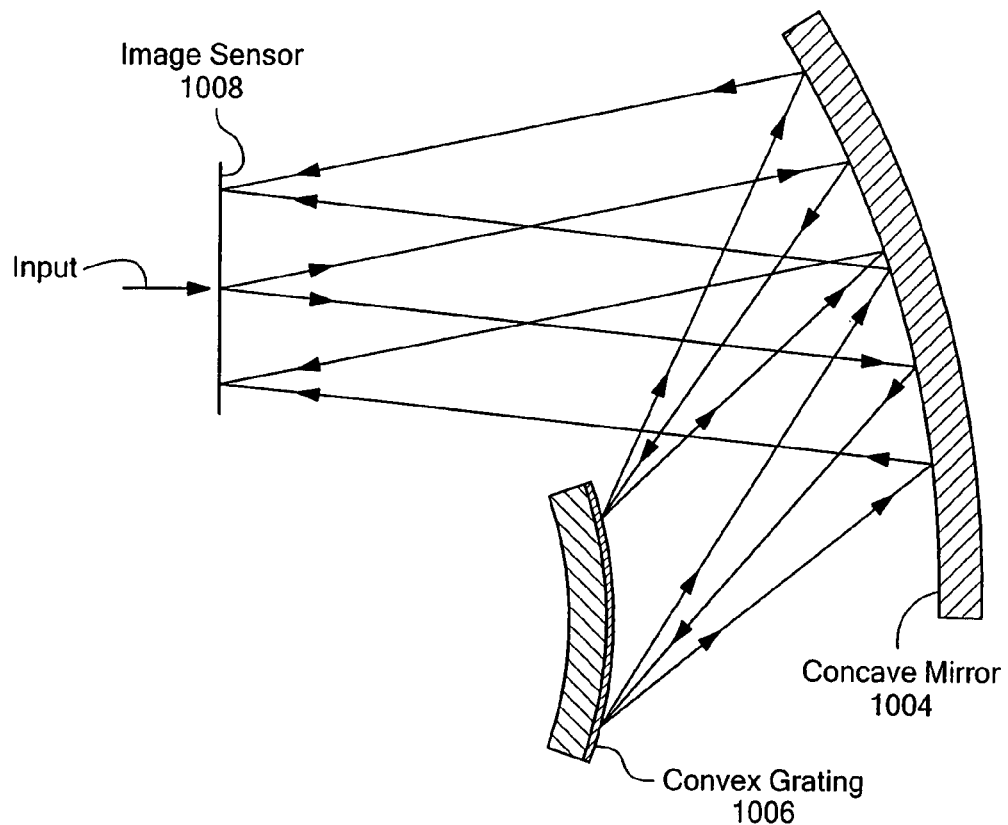
FIG. 12B is another cross-sectional view of the retroflective spectrometer of FIG. 10.

Retroflective spectrometers require only a single concave mirror 1004. Furthermore, light travels along a half-M-shaped path from the input slit 2002 to the convex grating 1006, and the dispersed light travels back along the same half-M-shaped path (as can be seen in FIG. 12B) to the image sensor 1008. Thus, unlike the conventional spectrometer 300 of FIG. 3, the image sensor 1008 can be disposed on the same side of the diffraction grating 1006 as the input slit 1002, yielding a more compact spectrometer.

Both low-dispersion, hyperspectral (full M-shaped optical path) and high-dispersion, retroflective (half-M-shaped optical path) spectrometers have been described. A choice between these two designs can be based on the input wavelengths of interest and/or the ranges of wavelengths that are to be imaged, because different input wavelengths produce different dispersion angles. For example, some input wavelengths do not yield satisfactory retroflective dispersion orders (i.e., provide sufficient spectral range in a high-dispersion order) to be useful in high-dispersion, retroflective designs. In these cases, the low-dispersion spectrometer may be more appropriate. In general, high-dispersion, retroflective spectrometers provide less spectral bandwidth (i.e., smaller ranges of wavelengths) than low-dispersion spectrometers.

Folded Input Multi-Channel Spectrometer

Figure 14:
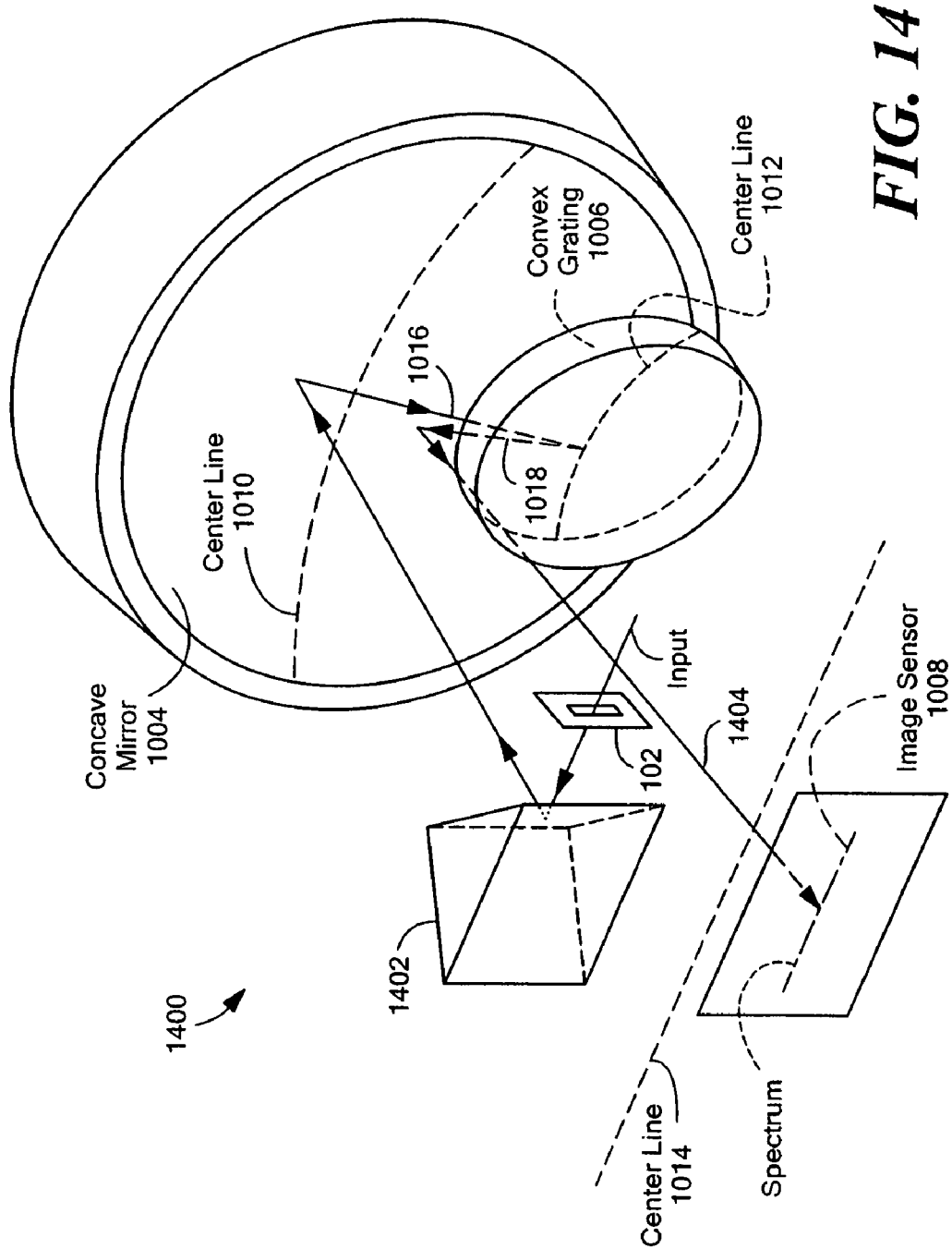
FIG. 14 is a perspective view of a retroflective, folded input channel spectrometer, according to one embodiment of the present invention.

In some instances, a large device, such as a camera or detector, is attached to a spectrometer to capture and/or process the spectrum or spectra produced by the spectrometer. For example, the image sensor 1008 (FIG. 10) can be part of a camera. In such cases, the camera or other device can be large enough to block the input slit 1002 or other light entry device. FIG. 14 is a perspective view of a spectrometer 1400 that is configured to enable attaching a large camera or other device, without blocking the input. The spectrometer 1400 includes a prism, mirror or other device 1402 to reflect the light of the input toward the concave mirror 1004. Such an arrangement is referred to as a "folded input channel" spectrometer. In a folded input channel spectrometer, the input light can be introduced parallel to the plane of the image sensor 1008 or at another angle, rather than perpendicular to the plane of the image sensor. Consequently, any size camera or other device can be attached to the spectrometer 1400, without blocking the input.

Alternatively, the prism, mirror or other device 1402 can be disposed in path 1404, thereby folding the output of the spectrometer, rather than folding the input.

Figure 15:
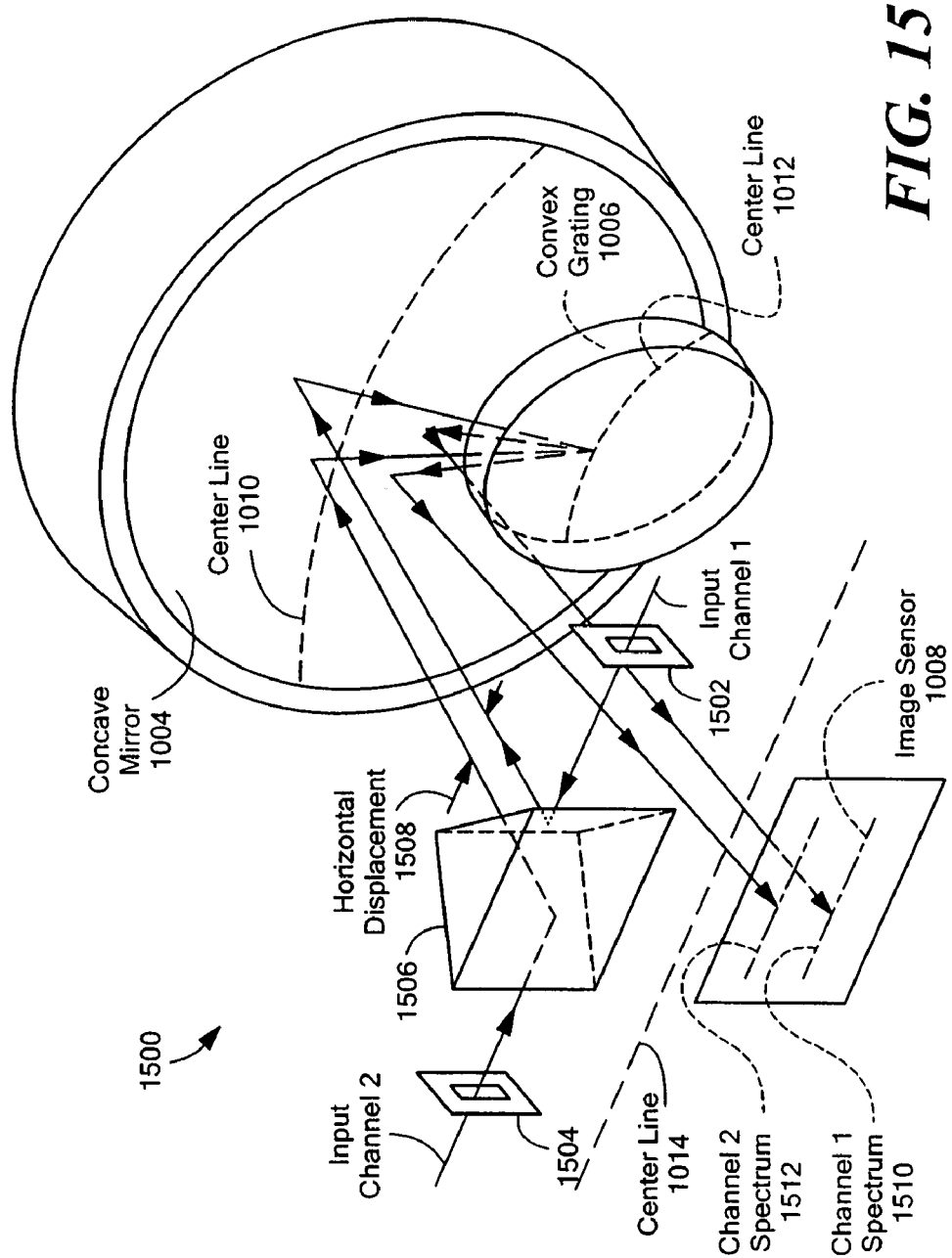
FIG. 15 is a perspective view of a retroflective, multi-channel, folded input spectrometer, according to one embodiment of the present invention.

The folded input channel spectrometer can be configured to accommodate more than one input channel, as shown in FIG. 15. Such a spectrometer 1500 includes two input slits or other light entry devices 1502 and 1504. As discussed above with respect to FIG. 4, the two input slits 1502 and 1504 are vertically displaced, with respect to each other. The spectrometer 1500 also includes a prism, two mirrors or other device 1506 to fold both input channels toward the concave mirror 1004. The faces of the prism or other device 1506 provide a horizontal displacement 1508 of the two input channels, with respect to each other, as discussed above with respect to FIG. 4. Two spectra 1510 and 1512 are projected onto the image sensor 1008.

Figure 16:
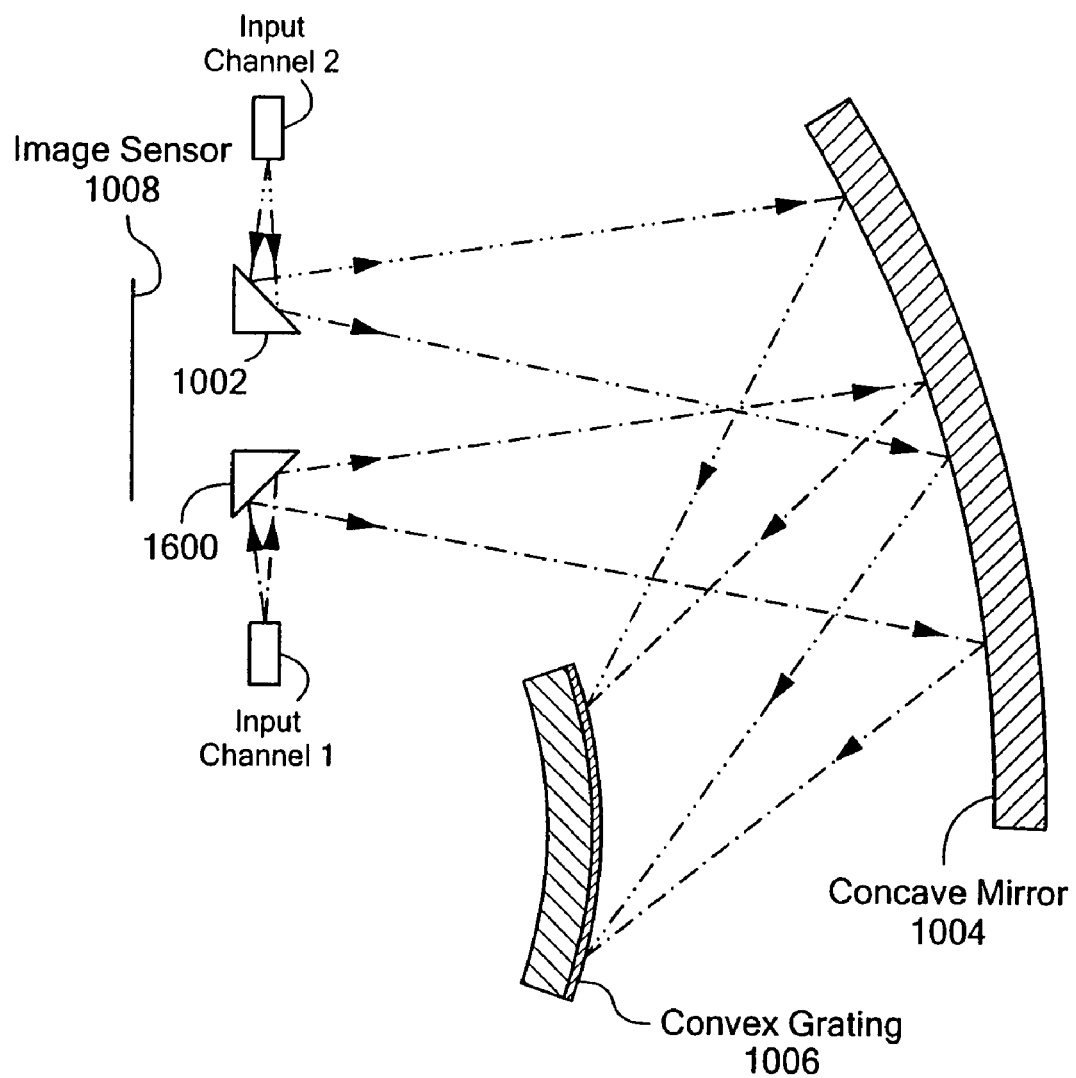
FIG. 16 is a cross-sectional view of an alternative embodiment of the spectrometer of FIG. 15.

Alternatively, as shown in FIG. 16 (which shows a cross-sectional view of an alternative multi-channel, folded-input spectrometer) the single prism 1506 shown in FIG. 15 is replaced by two separate prisms or mirrors 1600 and 1602.

Figure 17:
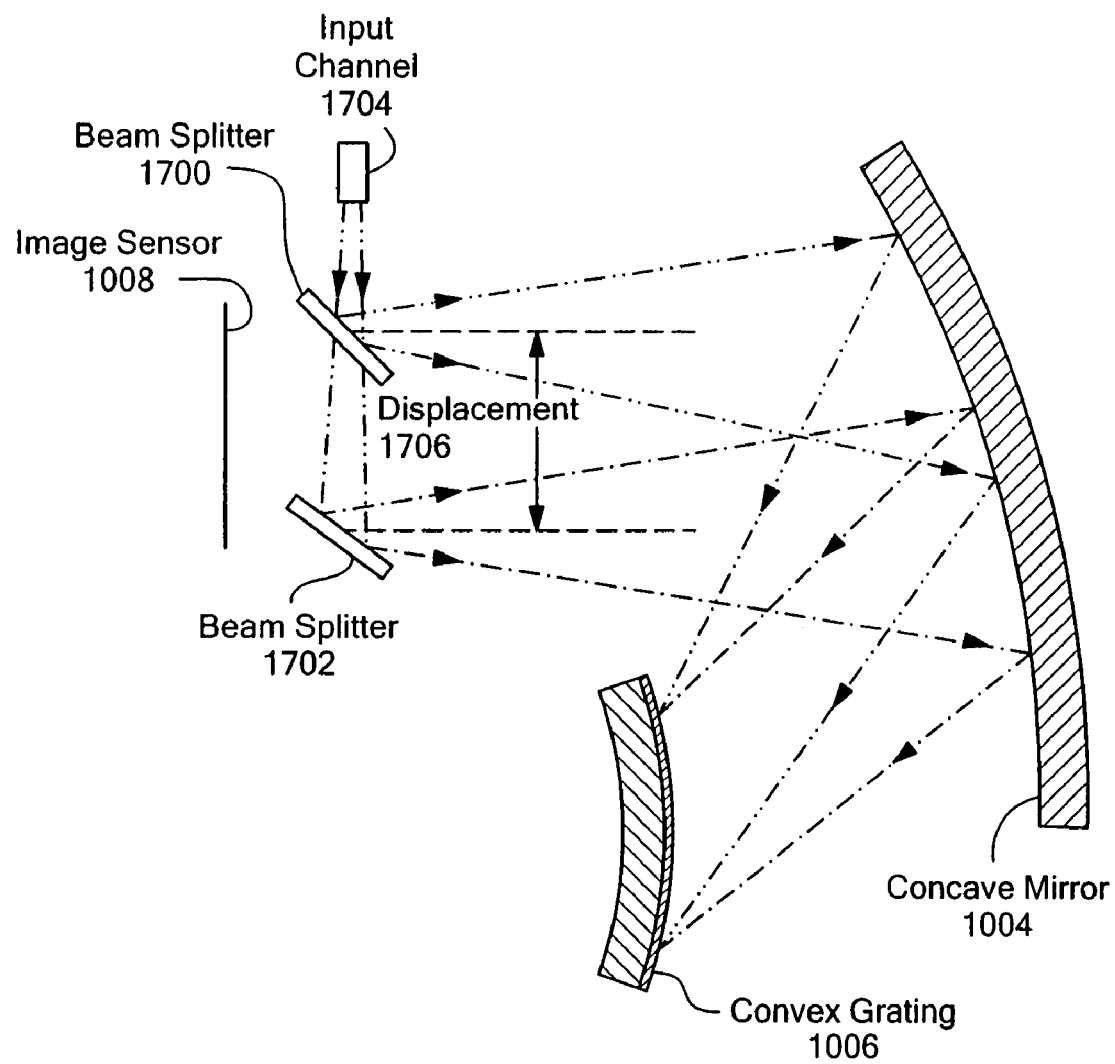
FIG. 17 is a cross-sectional view of another alternative embodiment of the spectrometer of FIG. 15.

In another alternative shown in FIG. 17, one or more beam splitters 1700 and 1702 are used to split the light of an input channel 1704 into two or more beams of light, each displaced 1706 with respect to each other. Additional beam splitters (not shown) can be used to split the input channel 1704 into additional beams. The last beam splitter (such as 1702) can be replaced by a mirror. All the beam splitters (and the optional mirror) need not be set at the same angle, with respect to the input beam. For example, each beam splitter 1702 and 1704 can be set at a respective angle, such that the beam of light reflected by the beam splitter toward the concave mirror 1004 eventually strikes the convex grating 1006 at a selected angle of incidence. For example, the angle of incidence can be selected to produce a dispersion fan having a desired range of wavelengths (and a desired dispersion angle, so all the spectra strike the image sensor 1702), according to the diffraction grating formula (1). Preferably, only a vertical portion of the light from the input channel 1704 is split by each beam splitter 1700-1702, so each split beam is vertically displaced, with respect to the other beams. In this way, the spectra projected on the image sensor 1008 can be separately imaged. Optionally, multiple input channels (not shown) can each be split by a set of beam splitters (not shown) into two or more beams.

Figure 18:
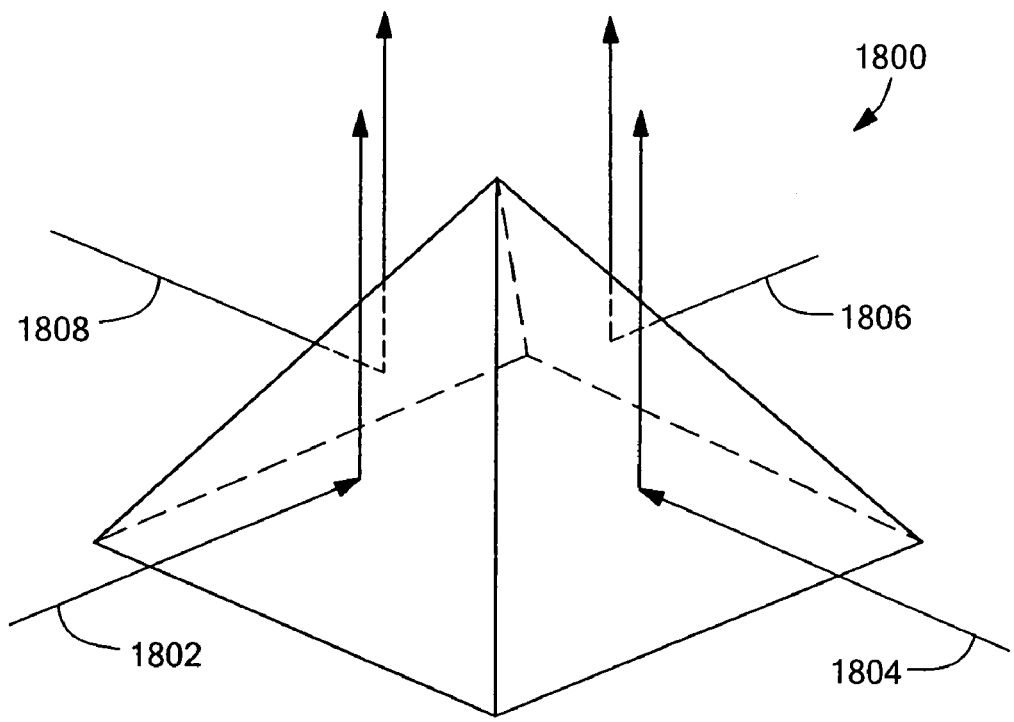
FIG. 18 is a perspective view of an alternative channel folding element, according to another embodiment of the present invention.

More than two input channels can be accommodated by using an appropriate folding element. For example, as shown in FIG. 18, a square-based pyramid 1800 can be used as the folding element for a four-channel spectrometer. Each of the input channels 1802, 1804, 1806 and 1808 is reflected by a different one of the triangular faces of the pyramid 1800. In this case, two channels enter the spectrometer horizontally, as shown in FIG. 15, and two other channels enter the spectrometer from above and below, respectively. Other orientations can, of course, be used.

Interconnection with Other Instrumentation or Systems

Figure 19:
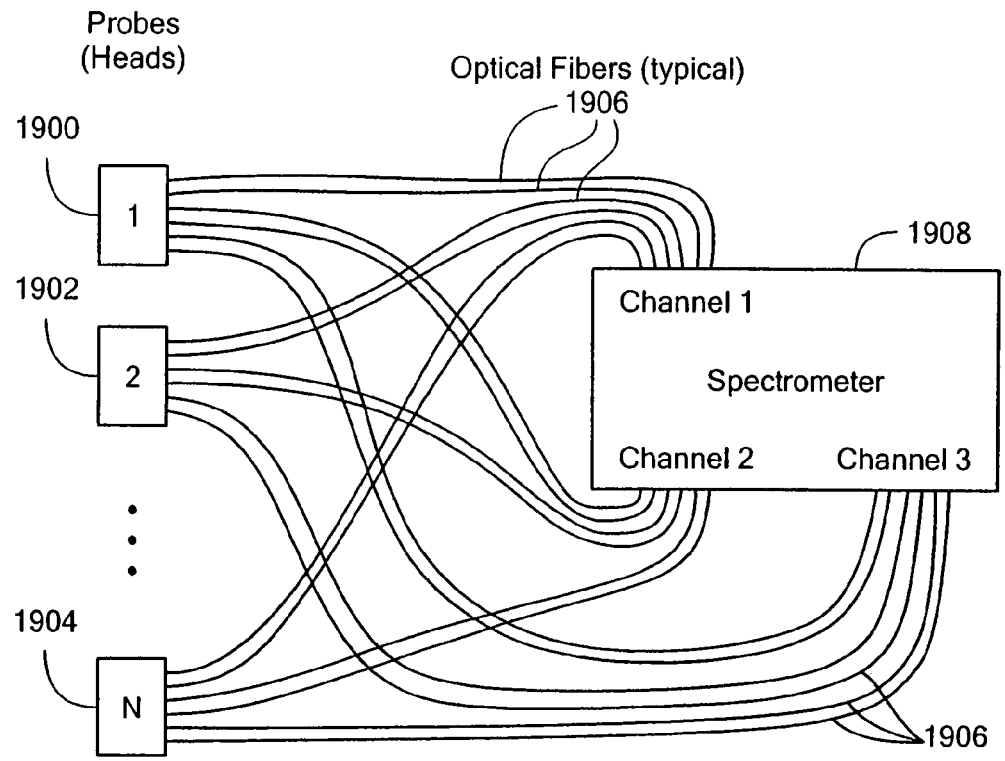
FIG. 19 is a schematic diagram of a spectrometer connected to a number of probes.

As noted with respect to FIG. 8, input(s) to the disclosed spectrometers can be provided by a stack of optical fibers, and not all of the optical fibers of a given channel need to carry light from a single light source. For example, as shown in FIG. 19, optical fibers 1906 from a number of probes or heads (such as probes 1900, 1902 and 1904) can be threaded to one or more input channels of a spectrometer 1908. For example, one or more of the probes 1900-1904 can be connected to a calibration source or a Raman laser (not shown), and other of the probes can be connected to collect light emitted from an object under test (not shown), such as an object that is illuminated by the laser. In another example, as part of a process control or monitoring system, each optical fiber 1906 is connected to collect light from a different portion of a chemical refinery or laboratory experiment.

Figure 20:
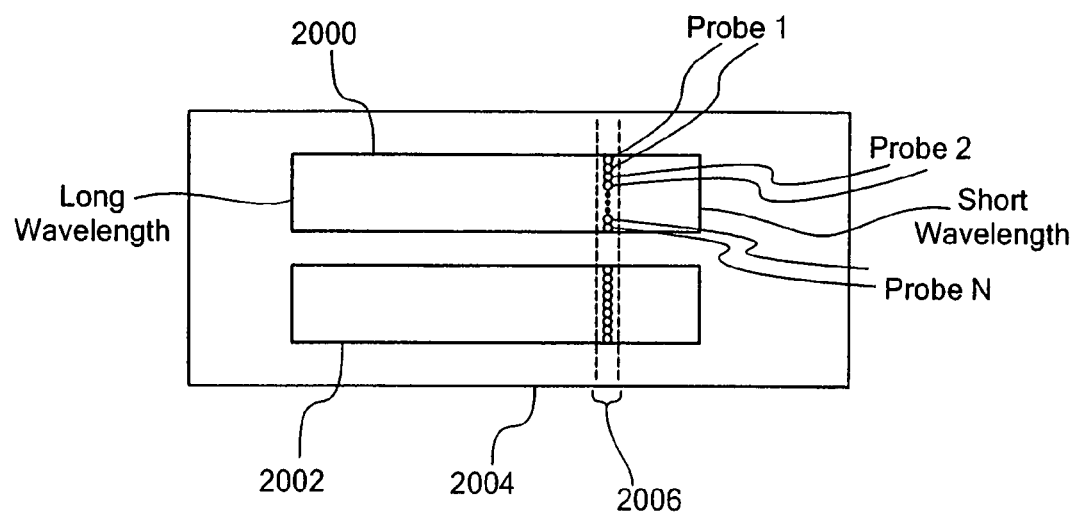
FIG. 20 is a schematic diagram of an image plane of the spectrometer of FIG. 19.

FIG. 20 shows exemplary spectra 2000 and 2002 projected on an imaging plane 2004 of the spectrometer 1908 of FIG. 19. Sample points are shown on the spectra 2000 and 2002 for a single range 2006 of wavelengths (encompassed between two dashed lines for clarity). Representative spectral points within this range 2006 and corresponding to the various probes 1800-1804 are also shown.

Products based on optical wavelength separation capabilities (such as multiplexers and de-multiplexers) can also be used in telecommunication systems for optical wavelength switching, such as fiber optic telecommunications systems, to separate wavelength-division multiplexed (WDM) channels carried over a single optical fiber, as described in U.S. Pat. No. 6,522,404, the contents of which are hereby incorporated by reference herein. The spectrometers disclosed herein can be used in such a grating-based communication switch.

Optical Element Adjustment Mechanism

A adjustment mechanism enables a curved optical element, such as a concave mirror, convex mirror, convex grating, spherical, toroidal, bionic or other curved optical element, to be adjusted within a spectrometer or other instrument, without requiring a gimbal mount. In one embodiment, two micrometer adjustments, one for imparting lateral translations and one for imparting transverse translations, can be used to position the optical element. For small excursions about a central location, such linear movements closely approximate the two angular degrees of freedom provided by a gimbal mount.

Figure 21:
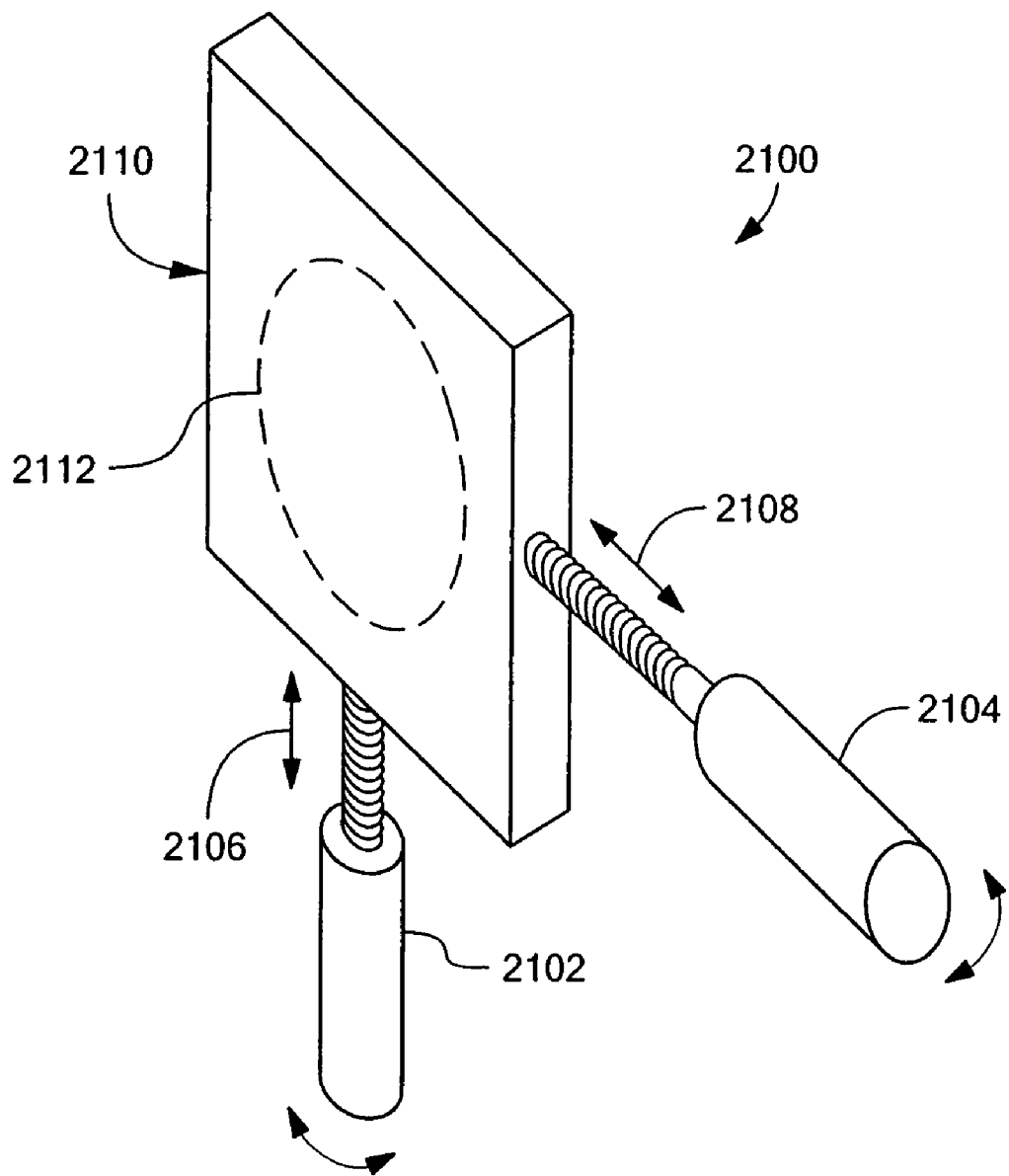
FIG. 21 is a perspective view of a optical element adjustment mechanism, according to one embodiment of the present invention.

FIG. 21 is a perspective view of one embodiment of an adjustment mechanism 2100 for a curved optical element. Two threaded micrometer adjusters 2102 and 2104 set the transverse 2106 and lateral 2108 position, respectively, of a mounting bracket 2110. The optical element (shown in phantom at 2112) is mounted to the bracket 2110.

Figure 22:
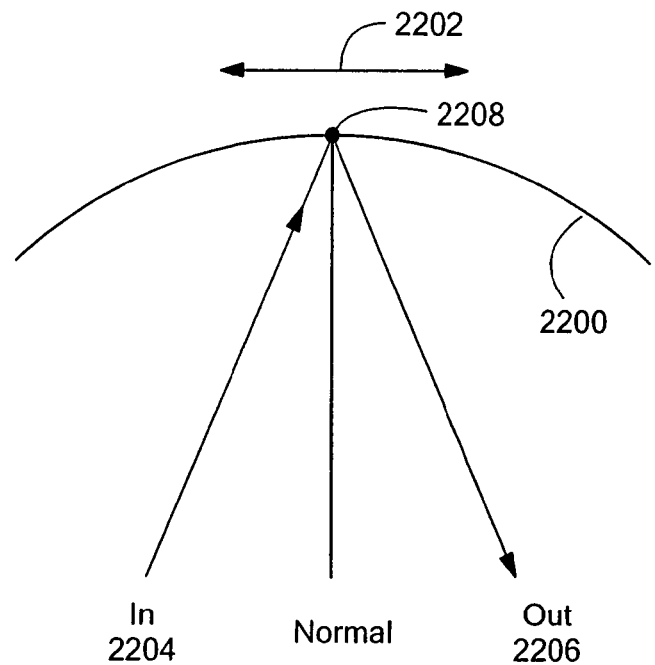
FIGS. 22 and 23 are schematic diagrams of operation of an optical adjustment mechanism, according to one embodiment of the present invention.

As shown in FIG. 22, a curved optic (exemplified by a curved mirror 2200) is positioned by the adjustment mechanism, so the optic can be translated laterally 2202 and transversely (along an axis (not shown) extending out of the figure). In one position, an input beam 2204 strikes the mirror 2200 and is reflected as an output beam 2206. In the example position shown in FIG. 22, the input beam strikes the center of the mirror 2200.

Figure 23:
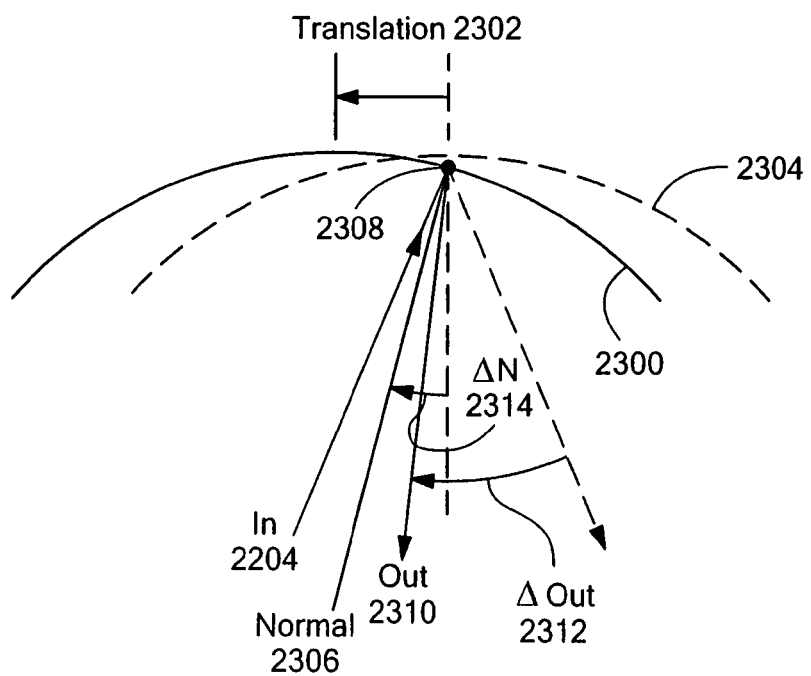

FIG. 23 shows the mirror 2300 after it has been translated 2302. The mirror's former location is shown in phantom at 2304. The input beam 2204 remains unchanged. As a result of the translation 2302 of the mirror 2300, the normal 2306 to the mirror at the point 2308 where the input beam 2204 strikes the mirror 2300 has changed. Thus, the angle of reflection has changed, and the output beam 2310 is now displaced by a delta (change) output 2312. It should be noted that, for a spherical mirror, the delta output 2312 is twice the delta (change) in the normal 2314.

In one embodiment, once a desired position for the optical element is reached, the optical element is fixed in place, such as with epoxy. Optionally, once the epoxy has cured, the positioning mechanism, such as the two-micrometer mechanism described above, can be removed.

In another embodiment, the mounting mechanism includes oversized holes, through which mounting screws are inserted. The heads of the screws are large enough not to project through the holes. Thus, if the screws are loosened, the optical element can be moved in two dimensions (laterally and transversely).

While the invention has been described through the above-described exemplary embodiments, it will be understood by those of ordinary skill in the art that modifications to, and variations of, the illustrated embodiments can be made without departing from the inventive concepts disclosed herein. For example, while in some embodiments the slits or other light entry devices have been described as being horizontally and/or vertically displaced, with respect to each other, these orientation and directional references are use to facilitate explaining the structure and operation of these embodiments; they are not intended to limit the scope of the invention. Displacements in other directions and other orientations are acceptable, as long as they result in at least a portion of each spectrum projected on an image sensor being spaced apart from another spectrum or spectra projected on the image sensor. Similarly, other displacements and orientations are acceptable, as long as they result in light beams striking a convex grating at selected angles. In addition, embodiments that include combinations and sub-combinations of the disclosed features are possible. For example, a spectrometer according to the present disclosure can include any combination of the multi-spectrum, multi-channel, folded input, retroreflective, light trapping and/or mirror mounting features discussed above. In addition, although spectrometers have been described as including diffraction gratings, other light dispersing elements, such as prisms, can be used. Accordingly, the invention should not be viewed as limited, except by the scope and spirit of the appended claims.

What is claimed is:

1. A multi-spectrum spectrometer, comprising:
   a first light entry device operative to admit light corresponding to a first input channel;
   a second light entry device operative to admit light corresponding to a second input channel;
   a light dispersion element;
   a first light focusing element operative to reflect and to focus the light admitted by the first light entry device and the light admitted by the second light entry device onto the light dispersion element, the light dispersion element being operative to disperse the light reflected and focused thereon by the first light focusing element;
   an imaging plane; and
   a second light focusing element operative to reflect and to focus the light dispersed by the light dispersion element onto the imaging plane, thereby producing a first spectrum and a second spectrum on the imaging plane, the first spectrum corresponding to the light admitted by the first light entry device, and the second spectrum corresponding to the light admitted by the second light entry device, wherein the first light entry device and the second light entry device are horizontally displaced with respect to each other to cause the light admitted by first light entry device to be reflected onto the light dispersion element at a first angle of incidence, and to cause the light admitted by the second light entry device to be reflected onto the light dispersion element at a second angle of incidence, the second angle of incidence being different from the first angle of incidence, and wherein the first light entry device and the second light entry device are vertically displaced with respect to each other so that at least a portion of the first spectrum produced on the imaging plane is vertically displaced with respect to at least a portion of the second spectrum produced on the imaging plane.

2. The spectrometer of claim 1, wherein the first and second light entry devices define respective first and second slits.

3. The spectrometer of claim 1, wherein:
the first light entry device comprises a first column of optical fibers; and
the second light entry device comprises a second column of optical fibers.

4. The spectrometer of claim 1, wherein the light dispersion element comprises a diffraction grating, and wherein the diffraction grating defines a plurality of straight, equally spaced grooves.

5. The spectrometer of claim 1, wherein the light dispersion element comprises a diffraction grating, and wherein the diffraction grating comprises a holographic grating.

6. The spectrometer of claim 1, wherein the first and second light focusing elements comprise respective concave mirrors.

7. The spectrometer of claim 1, wherein the first and second light focusing elements comprise a single concave mirror.

8. The spectrometer of claim 1, wherein the imaging plane comprises an electronic imaging device.

9. The spectrometer of claim 8, wherein the electronic imaging device comprises a charge-coupled device (CCD).

10. The spectrometer of claim 1, wherein the imaging plane comprises a camera.

11. The spectrometer of claim 1, wherein the imaging plane comprises a channel selector.

12. The spectrometer of claim 1, further comprising a light trap positioned to trap dispersed light of at least one selected order of dispersion from the light dispersing element.

13. The spectrometer of claim 1, further comprising:
a first folding optical element disposed between the first light entry device and the first light focusing element and in a path of the light entering the first light entry device; and
a second folding optical element disposed between the second light entry device and the first light focusing element and in a path of the light entering the second light entry device.

14. The spectrometer of claim 13, wherein the first and second light folding elements comprise a single prism.

15. The spectrometer of claim 13, wherein the first and second light folding elements comprise respective first and second prisms.

16. The spectrometer of claim 13, wherein the first and second light folding elements comprise respective first and second mirrors.

17. A retroflective spectrometer, comprising:
a light entry device operative to admit light corresponding to a light input channel;
a light dispersion element, the light dispersion element comprising a convex diffraction grating;
a light focusing element operative to reflect and to focus, onto the light dispersion element, the light admitted by the light entry device along a first path at a selected angle of incidence,
wherein the light dispersion element is operative, for a selected range of wavelengths of incident light reflected thereon at the selected angle of incident and for a selected order of dispersion, to disperse the incident light so that light of the selected order of dispersion is dispersed back along the first path within about 20 degrees; and
an imaging plane disposed on the same side of the light dispersion element as the light entry device,
wherein the light focusing element is further operative to reflect, onto the imaging plane, the light of the selected order of dispersion dispersed back along the first path by the light dispersion element.

18. The spectrometer of claim 17, wherein the selected order of dispersion is a first order of dispersion.

19. The spectrometer of claim 17, wherein the selected order of dispersion is a second order of dispersion.

20. The spectrometer of claim 17, wherein the selected order of dispersion is a negative first order of dispersion.

21. The spectrometer of claim 17, wherein the selected order of dispersion is a negative second order of dispersion.

22. The spectrometer of claim 17, wherein the light of the selected order of dispersion is dispersed back along the first path within about 10 degrees.

23. The spectrometer of claim 17, wherein the light of the selected order of dispersion is dispersed back along the first path within about 5 degrees.

24. The spectrometer of claim 17, wherein the first light entry device defines a first slit.

25. The spectrometer of claim 17, wherein the diffraction grating defines a plurality of straight, equally spaced grooves.

26. The spectrometer of claim 17, wherein the diffraction grating comprises a holographic grating.

27. The spectrometer of claim 17, wherein the light focusing element comprises a concave mirror.

28. The spectrometer of claim 17, wherein the imaging plane comprises an electronic imaging device.

29. The spectrometer of claim 17, further comprising a light trap positioned to trap dispersed light of at least one order of dispersion, other than the selected order of dispersion, from the light dispersing element.

30. A multi-spectrum, retroflective, folded input spectrometer, comprising:
at least one light entry device, the light entry device being operative to admit light propagating along a first light input channel path;
a light focusing element;
at least one folding optical element, the folding optical element being operative to reflect the light admitted by the. light. entry device onto the light focusing element;
a light dispersion element, the light dispersion element comprising a convex diffraction grating,
wherein the light focusing element is operative to reflect and to focus, onto the light dispersion element, the light reflected thereon by the folding optical element along a second path at a selected angle of incidence,
wherein the light dispersion element is operative, for a selected range of wavelengths of incident light reflected thereon at the selected an of incidence and for a selected order of dispersion, to disperse the incident light so that light of the selected order of dispersion is dispersed back along the second path within about 20 degrees; and an imaging plane disposed on the same side of the light dispersion element as the light entry device wherein the light focusing element is further operative to reflect, onto the imaging plane, the light of the selected order of dispersion dispersed back along the second path by the light dispersion element, and wherein the first light input channel path is oriented in a direction non-perpendicular to the imaging plane.

31. A multi-spectrum spectrometer, comprising:

a light dispersion element;

a first light focusing element;

a first light entry device positioned such that light entering the first light entry device is directed by the first light focusing element onto the light dispersion element at a first angle of incidence;

a second light entry device positioned such that light entering the second light entry device is directed by the first light focusing element onto the light dispersion element at a second angle of incidence, different than the first angle of incidence;

an imaging plane;

a second light focusing element positioned to direct light dispersed by the light dispersion element onto the imaging plane, wherein the first and second light entry devices, the first and second light focusing elements and the light dispersion element are positioned such that at least a portion of a first spectrum produced on the imaging plane by dispersed light from the first light entry device is spaced apart from at least a portion of a second spectrum produced on the imaging plane by dispersed light from the second light entry device;

a first folding optical element disposed between the first light entry device and the first light focusing element and in a path of the light entering the first light entry device; and a second folding optical element disposed between the second light entry device and the first light focusing element and in a path of the light entering the second light entry device, wherein the first light folding element comprises at least one first beam splitter, and wherein the second light folding element comprises at least one second beam splitter.

32. A multi-spectrum spectrometer, comprising:

a light dispersion element;

a first light focusing element;

a first light entry device positioned such that light entering the first light entry device is directed by the first light focusing element onto the light dispersion element at a first angle of incidence;

a second light entry device positioned such that light entering the second light entry device is directed by the first light focusing element onto the light dispersion element at a second angle of incidence, different than the first angle of incidence;

an imaging plane;

a second light focusing element positioned to direct light dispersed by the light dispersion element onto the imaging plane, wherein the first and second light entry devices, the first and second light focusing elements and the light dispersion element are positioned such that at least a portion of a first spectrum produced on the imaging plane by dispersed light from the first light entry device is spaced apart from at least a portion of a second spectrum produced on the imaging plane by dispersed light from the second light entry device;

a first folding optical element disposed between the first light entry device and the first light focusing element and in a path of the light entering the first light entry device; and a second folding optical element disposed between the second light entry device and the first light focusing element and in a path of the light entering the second light entry device, wherein the first and second light folding elements comprise a single square-based pyramid.

33. A retroflective spectrometer, comprising:

a light dispersion element operable, for a selected range of wavelengths of incident light that is incident upon the light dispersion element at a selected angle of incidence, and for a selected order of dispersion, to disperse the incident light, such that light of the selected order of dispersion is dispersed back along a path of the incident light, within about 20 degrees of the path of the incident light;

a light focusing element;

a first light entry device positioned such that light entering the first light entry device is directed by the light focusing element onto the light dispersion element at the selected angle of incidence;

an imaging plane disposed on the same side of the light dispersion element as the first light entry device;

wherein the first light entry devices, the light focusing element and the light dispersion element are positioned such that the light of the selected order of dispersion is directed by the light focusing element onto the imaging plane; and a second light entry device positioned such that light entering the second light entry device is directed by the light focusing element onto the light dispersion element at an angle of incidence different than the selected angle of incidence, wherein the first and second light entry devices, the light focusing element and the light dispersion element are positioned such that at least a portion of a first spectrum produced on the imaging plane by dispersed light from the first light entry device is spaced apart from at least a portion of a second spectrum produced on the imaging plane by dispersed light from the second light entry device, wherein the retroflective spectrometer further includes:

a first folding optical element disposed between the first light entry device and the light focusing element and in a path of the light entering the first light entry device; and a second folding optical element disposed between the second light entry device and the light focusing element and in a path of the light entering the second light entry device, wherein the first light folding element comprises at least one first beam splitter, and the second light folding element comprises at least one second beam splitter.

34. A retroflective spectrometer, comprising:

a light dispersion element operable, for a selected range of wavelengths of incident light that is incident upon the light dispersion element at a selected angle of incidence, and for a selected order of dispersion, to disperse the incident light, such that light of the selected order of dispersion is dispersed back along a path of the incident light, within about 20 degrees of the path of the incident light;

a light focusing element;

a first light entry device positioned such that light entering the first light entry device is directed by the light focusing element onto the light dispersion element at the selected angle of incidence;

an imaging plane disposed on the same side of the light dispersion element as the first light entry device;

wherein the first light entry devices, the light focusing element and the light dispersion element are positioned such that the light of the selected order of dispersion is directed by the light focusing element onto the imaging plane; and a second light entry device positioned such that light entering the second light entry device is directed by the light focusing element onto the light dispersion element at an angle of incidence different than the selected angle of incidence, wherein the first and second light entry devices, the light focusing element and the light dispersion element are positioned such that at least a portion of a first spectrum produced on the imaging plane by dispersed light from the first light entry device is spaced apart from at least a portion of a second spectrum produced on the imaging plane by dispersed light from the second light entry device, wherein the retroflective spectrometer further includes:

a first folding optical element disposed between the first light entry device and the light focusing element and in a path of the light entering the first light entry device; and a second folding optical element disposed between the second light entry device and the light focusing element and in a path of the light entering the second light entry device, wherein the first and second light folding elements comprise a single square-based pyramid.

* * * * *

UNITED STATES PATENT AND TRADEMARK OFFICE
CERTIFICATE OF CORRECTION

PATENT NO. : 7,518,722 B2  Page 1 of 2
APPLICATION NO. : 11/208443
DATED : April 14, 2009
INVENTOR(S) : Didona et al.

It is certified that error appears in the above-identified patent and that said Letters Patent is hereby corrected as shown below:

Please delete item "(12) Julian et al." and insert item --(12) Didona et al.--; delete item (75) and insert item (75) as shown on the attached title page.

Signed and Sealed this

Twelfth Day of January, 2010

David J. Kappos
*Director of the United States Patent and Trademark Office*

United States Patent
Julian et al.

(10) Patent No.: US 7,518,722 B2
(45) Date of Patent: Apr. 14, 2009

(54) MULTI-CHANNEL, MULTI-SPECTRUM IMAGING SPECTROMETER

(75) Inventors: Jason P. Julian, Rutland, MA (US); Kevin M. Didona, Chelmsford, MA (US); Darrin P. Milner, Litttleton, MA (US); Thomas L. Mikes, Palm City, FL (US); Scott D. Milligan, Hubbardston, MA (US); David P. Bannon, Hopkinton, MA (US)

(73) Assignee: Headwall Photonics, Inc., Fitchburg, MA (US)

(*) Notice: Subject to any disclaimer, the term of this patent is extended or adjusted under 35 U.S.C. 154(b) by 235 days.

(21) Appl. No.: 11/208,443

(22) Filed: Aug. 19, 2005

(65) Prior Publication Data

US 2006/0038997 A1    Feb. 23, 2006

Related U.S. Application Data

(60) Provisional application No. 60/602,747, filed on Aug. 19, 2004.

(51) Int. Cl.
*G01J 3/36* (2006.01)
*G02B 5/18* (2006.01)

(52) U.S. Cl. .................. 356/328; 359/570; 359/572

(58) Field of Classification Search ............ 356/328, 356/326; 359/566, 569–575
See application file for complete search history.

(56) References Cited

U.S. PATENT DOCUMENTS

| | | | | |
|---|---|---|---|---|
| 4,259,014 | A | * | 3/1981 | Talmi ............ 356/328 |
| 4,375,919 | A | * | 3/1983 | Busch ............ 356/326 |
| 4,494,872 | A | * | 1/1985 | Busch ............ 356/328 |
| 4,566,792 | A | * | 1/1986 | Suzuki ............ 356/319 |
| 4,983,039 | A | * | 1/1991 | Harada et al. ............ 356/328 |
| 5,880,834 | A | * | 3/1999 | Chrisp ............ 356/328 |
| 5,995,221 | A | * | 11/1999 | Slutter et al. ............ 356/326 |
| 6,081,331 | A | * | 6/2000 | Teichmann ............ 356/328 |
| 6,100,974 | A | * | 8/2000 | Reininger ............ 356/300 |
| 6,181,418 | B1 | * | 1/2001 | Palumbo et al. ............ 356/328 |
| 6,204,919 | B1 | * | 3/2001 | Barshad et al. ............ 356/326 |
| 6,266,140 | B1 | | 7/2001 | Xiang et al. |
| 6,288,781 | B1 | * | 9/2001 | Lobb ............ 356/326 |

(Continued)

*Primary Examiner*—Gregory J. Toatley, Jr.
*Assistant Examiner*—Bryan Giglio
(74) *Attorney, Agent, or Firm*—Weingarten, Schurgin, Gagnebin & Lebovici LLP

(57) ABSTRACT

A multi-spectrum, multi-channel imaging spectrometer includes two or more input slits or other light input devices, one for each of two or more input channels. The input slits are vertically and horizontally displaced, with respect to each other. The vertical displacements cause spectra from the two channels to be vertically displaced, with respect to each other, on a single image sensor on a stationary image plane. The horizontal displacements cause incident light beams from the respective input channels to strike a convex grating at different respective incidence angles and produce separate spectra having different respective spectral ranges. A retroflective spectrometer includes a convex grating that, by diffraction, disperses wavelengths of light at different angles and orders approximately back along an incident light beam. A single concave mirror reflects both the input channel and the dispersed spectrum. A prism, set of mirrors, beam splitters or other optical element(s) folds the input channel(s) of a spectrometer to enable the input(s) to be moved away from the plane of the image sensor, thereby enabling a large camera or other device to be attached to the spectrometer without blocking the input(s). A mounting mechanism enables a curved optical element to be adjusted through lateral and transverse translations, without requiring a gimbal mount.

34 Claims, 20 Drawing Sheets

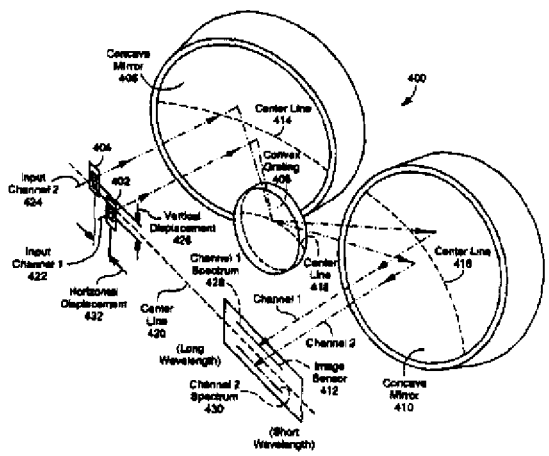

UNITED STATES PATENT AND TRADEMARK OFFICE
CERTIFICATE OF CORRECTION

PATENT NO.         : 7,518,722 B2                              Page 1 of 1
APPLICATION NO.    : 11/208443
DATED              : April 14, 2009
INVENTOR(S)        : Kevin M. Didona et al.

It is certified that error appears in the above-identified patent and that said Letters Patent is hereby corrected as shown below:

Column 14, claim 30, line 63, "an of" should read --angle of--;

Column 15, claim 30, line 1, "disposed." should read --disposed--;

Column 15, claim 30, line 2, "device" should read --device,--;

Column 16, claim 32, line 5, "the." should read --the--;

Column 16, claim 34, line 62, ".a" should read --a--.

Signed and Sealed this

Twenty-seventh Day of April, 2010

David J. Kappos
*Director of the United States Patent and Trademark Office*